United States Patent
Ott et al.

(10) Patent No.: US 12,449,431 B2
(45) Date of Patent: Oct. 21, 2025

(54) TRACKING OF LYSING AT A LOCATION ON A TISSUE SECTION

(71) Applicant: TECAN TRADING AG, Männedorf (CH)

(72) Inventors: Philipp Ott, Steg (CH); Yves Wurmitzer, Meilen (CH); Volfgang Vilaj, Uetikon am See (CH)

(73) Assignee: TECAN TRADING AG, Männedorf (CH)

( * ) Notice: Subject to any disclaimer, the term of this patent is extended or adjusted under 35 U.S.C. 154(b) by 589 days.

(21) Appl. No.: 17/980,009

(22) Filed: Nov. 3, 2022

(65) Prior Publication Data
US 2023/0152338 A1    May 18, 2023

(30) Foreign Application Priority Data
Nov. 8, 2021    (EP) ..................... 21206864

(51) Int. Cl.
*C12M 1/00*    (2006.01)
*G01N 1/34*    (2006.01)
*G01N 35/00*    (2006.01)
*G01N 35/10*    (2006.01)

(52) U.S. Cl.
CPC ......... *G01N 35/00029* (2013.01); *G01N 1/34* (2013.01); *G01N 35/1009* (2013.01)

(58) Field of Classification Search
None
See application file for complete search history.

(56) References Cited

U.S. PATENT DOCUMENTS

2014/0087359 A1* 3/2014 Njoroge ................... C12N 1/06
                                                                435/325

FOREIGN PATENT DOCUMENTS

| EP | 3 034 602 | 6/2016 |
|---|---|---|
| WO | 99/45372 | 9/1999 |
| WO | 2020/032969 | 2/2020 |
| WO | 2020/084412 | 4/2020 |
| WO | 2020/131070 | 6/2020 |
| WO | 2020/131072 | 6/2020 |
| WO | 2020/132394 | 6/2020 |

OTHER PUBLICATIONS

Bican et al., "3D Rigid registration by cylindrical phase correlation method", Pattern Recognition Letters 30 (2009) pp. 914-921.
Wolberg et al., "Robust image registration using log-polar transform", *IEEE Intl. Conf. on Image Processing*, Sep. 2000., 5 pages.
Bican et al., "Cylindrical Phase Correlation Method", CAIP 2007, LNCS 4673, pp. 751-758, 2007.

* cited by examiner

*Primary Examiner* — Jyoti Nagpaul
(74) *Attorney, Agent, or Firm* — Nixon & Vanderhye, P.C.

(57) ABSTRACT

Some embodiments are directed to a method for tracking lysis progress in an automated lysing device. For example, the lysing device may be configured to execute multiple iterations of lysing at a defined location on the tissue section and imaging the defined location on the tissue section using a camera. From the images a lysing parameter may be determined to improve lysing.

19 Claims, 16 Drawing Sheets

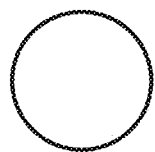
Fig. 2e.1
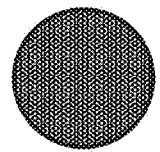
Fig. 2e.2
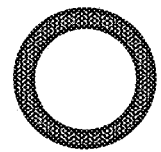
Fig. 2e.3
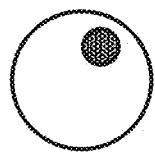
Fig. 2e.4
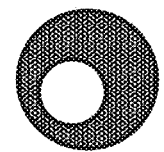
Fig. 2e.5
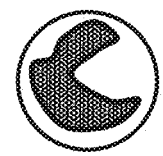
Fig. 2e.6
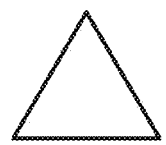
Fig. 2e.7
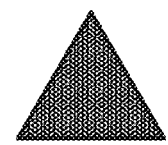
Fig. 2e.8
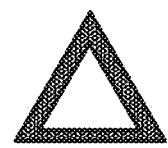
Fig. 2e.9

TRACKING OF LYSING AT A LOCATION ON A TISSUE SECTION

This application claims priority to EP Patent Application No. 21206864.7 filed Nov. 8, 2021, the entire contents of which are hereby incorporated by reference.

TECHNICAL FIELD

The presently disclosed subject matter relates to a method for tracking lysis progress, a method for tissue lysing, a lysing tracking system, a lysing system, a computer readable medium.

BACKGROUND

The international patent application WO2020131070, with title "Method of treating a sample", and included herein by reference, discloses a method of treating an isolated area of a sample with a liquid. A known method disclosed therein comprises the steps of:
generating an isolated area of a sample by means of a first fluid reservoir, the first fluid reservoir enclosing a distal end of a second fluid reservoir, and the isolated area of the sample being sealed towards the remaining area of the sample,
bringing the isolated area of the sample into fluid connection with the second fluid reservoir,
dispensing a fluid from the second fluid reservoir into the first fluid reservoir, thereby generating a fluid flow on the sample at the isolated area in a first direction, and
aspirating the fluid from the first fluid reservoir into the second fluid reservoir, thereby generating a fluid flow on the sample at the isolated area in a second direction.

For example, FIG. 9 of the above patent application shows a microscope image of a formalin fixed paraffin embedded (FFPE) section of a tissue. The corresponding description gives an example of treatment of the slide comprising the tissue section.

SUMMARY

The inventors found that the speed at which tissue is lysed from the tissue section can vary by tissue type and by the details of the lysing method, e.g., fluid type, and lysing parameters. To increase the amount tissue detached from a location on the tissue section, e.g., lysed, from the tissue section, one typically executes multiple iterations of lysing at the location. It would be advantageous to have an improved method of tracking lysis progress. To track progress one may execute multiple iterations of imaging at the defined location on the tissue section multiple times using a camera, thus obtaining multiple images. Tracking progress may be obtained from lysis progress values that can be determined from images taken after lysing at a location of the tissue section.

After a lysing at the defined location, an image can be taken of the tissue section, showing the defined location. From the images a lysing parameter may be determined to improve lysing, e.g., at a new location. For example, from the images lysis progress at the defined location can be determined. This progress can be expressed in a lysis progress value. For example, the lysis progress value can be proportional to the amount of lysed material. The lysis progress values give information that allow one to modify the lysing process, e.g., change the number of iterations or other lysing parameters, e.g., duration of an iteration, the amount of shear force applied, the temperature, and so on.

This tracking method has the advantage that it can be performed automatically or semi-automatically, e.g., by the lysing device itself. Moreover, the tracking method does not need physical access to the tissue section, and so does not disturb the tissue section. The tracking is in particular useful for paraffined and/or formalin fixed tissue, but is not limited to such tissues.

For example, in an embodiment, a user may define multiple locations. A first location may be used for a data gathering run. Lysing parameters determined or modified on the basis of lysis progress values can be used when lysing at further defined locations. A defined location is a spot on the tissue section. A defined location is associated with a lysis area where lysing takes place. The lysis area in turn is determined by the shape of the pipetting tip, or tip extender if one is used. For example, the area may be a disc, triangle, square and the like. For example, the lysis area may be a circular area defined by the circular area corresponding to the inner diameter of a lysis chamber defined by the pipetting tip. The area is also referred to as the area of interest. The area of interest is what needs to be detached in the end. In a typical application, the tissue section is lysed at multiple defined locations.

The lysis progress values can be determined from the images, e.g., from pixel values in the lysis area at the defined location. Pixel values outside the area may be used for comparison. One may also, or instead, normalize the pixels values. For example, a lysis progress value may be an average of all or part of the lysis area at the defined location.

In an embodiment, tracking lysis progress comprises determining a lysis progress value for an image comprises determining pixel values at the location in the image and applying a lysis value function to the determined pixel values. For example, it may comprise identifying the defined location, e.g., the lysis area, obtaining one or more pixel values from the identified location, and applying a lysis value function, e.g., a possibly weighted average.

A complication that may sometimes occur, is that the image has an impairment, in particular at the location where progress values may be computed from. For example, impairments may occur due to the lighting. For example, an illumination reflection may form at the location. Such a reflection may be detected and avoided in the computation of progress values. A particular complication that may sometimes occur is that bubbles may form during the lysis process. Bubbles are harmless for the lysing process itself, and for the lysate that is obtained, but the visual image of a bubble in the image can decrease the accuracy of the lysis progress value. There are various ways to deal with this phenomenon. One approach is to accept the occasional accuracy decrease, as lysis progress values will still give a general indication of lysis progress, even if less accurate. A second approach is to adjust the lysing process, e.g., restrict to tissue types having less bubble formation or to lower the intensity of the lysing process. The formulation of the lysis buffer can be adjusted to cause fewer bubble formation. A third approach is to detect bubbles in the image of the lysis area and to adjust the computation of the lysis progress value to take account of their presence. As will be discussed herein there are several ways to do this.

To avoid the impact of bubble formation on the lysis progress value one may determine the lysis progress value from parts of the area without bubbles. In an embodiment, determining a lysis progress value for an image comprises detecting a non-bubble part at the location in the image where bubbles are absent, and determining the lysis progress value from pixel values at the non-bubble part in the image.

Avoiding parts of the image affected by bubbles can be done in various ways. For example, one may determine the lysis progress value from the edge of the lysis area, where bubbles are less likely to form. For example, one may identify the bubble and discard that part of the image. Discarding part of the image may be done by using a mask. The mask may be a binary mask. For example, in an embodiment, a mask is determined that indicates bubbles in the image. By applying the mask to the image, and determining the lysis progress value from pixel values at a non-masked part of the image, the quality of the lysis progress values is improved.

A tracking device and/or lysing device is an electronic device, which may comprise a computer, e.g., to perform a tracking method and/or to control the lysing process. The tracking method described herein has the advantage that lysing may be better tracked, which is useful for testing and debugging, but also to improve throughput and/or the amount of lysed material.

An aspect is a tracking method and/or a lysing method. An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

Another aspect of the presently disclosed subject matter is a method of making the computer program available for downloading.

BRIEF DESCRIPTION OF DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1a schematically shows an example of an embodiment of a lysing device, FIG. 1b schematically shows an example of an embodiment of a pipetting tip, FIG. 2a schematically shows an example of an embodiment of a lysing system, FIG. 2b schematically shows an example of an embodiment of a lysing system, FIG. 2c schematically shows an example of an embodiment of a lysing system, FIG. 2d schematically shows an example of an embodiment of an image, FIGS. 2e.1 and 2e.7 schematically shows an example of an embodiment of a location, FIGS. 2e.2-2e.6, 2e.8 and 2e.9 schematically illustrate examples of determining a lysis progress value.

REFERENCE SIGNS LIST

Figure 1A:
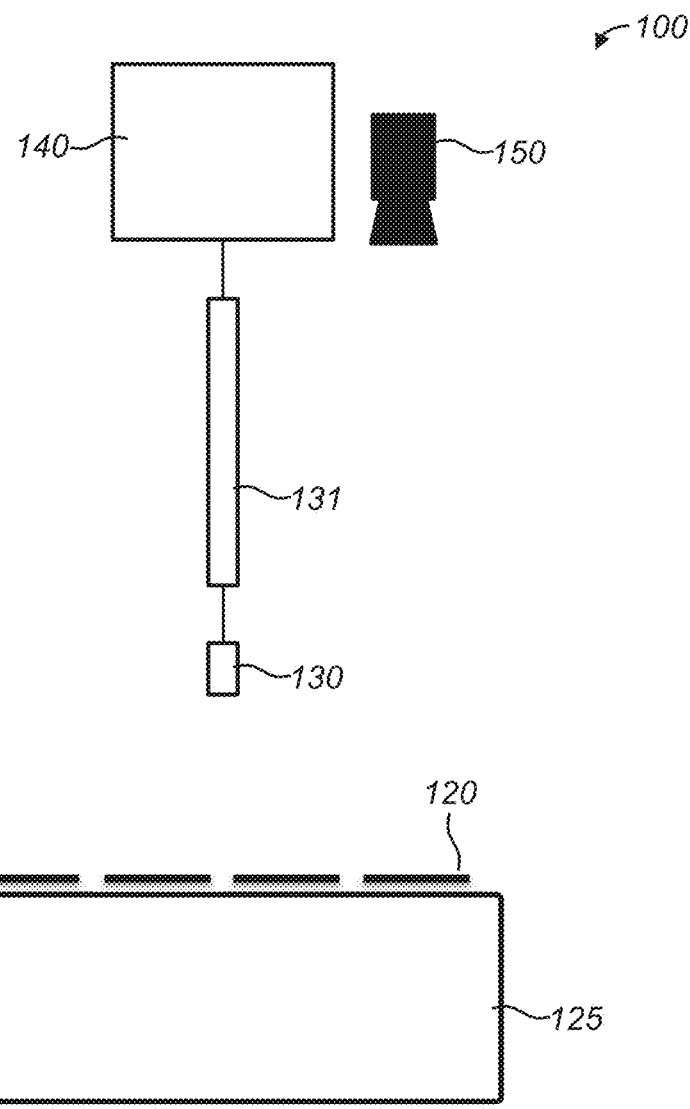

The following list of references and abbreviations corresponds to FIGS. 1a-8c, and 10a-10b, and is provided for facilitating the interpretation of the drawings and shall not be construed as limiting the claims.

100 a lysing device
120 a slide
125 a slide support
130 pipetting tip
131 a pipetting arm
140 a lysing unit
150 a camera
161 inflow of lysing fluid
162 outflow of lysate
163 a pipetting tip
164 a lysis chamber
200, 201 a lysing system
210 a tracking device
230, 270 a processor system
240, 280 a storage
250, 290 a communication interface
260 a lysing device
265 a lysing apparatus
266 a camera
300 a lysing system
310 image processing part
320 an image analyzing unit
330 a lysis progress unit
340 a lysing management unit
350 a lysing apparatus
360 a camera
361 multiple images
371 a previous location
372 a defined location
380 an image 381 a location and lysis area
382 a pixel
383 a pixel value
401 a mask
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

FIG. 1a schematically shows an example of an embodiment of a lysing device 100. Lysing device 100 is an example of a lysing device that may be used in or with an embodiment, e.g., an embodiment of a tracking method or tracking device. Lysis device 100 may have tracking functionality, e.g., comprise a tracking device, or may be combined with a tracking device.

Shown in FIG. 1a is a slide 120. Slide 120 is arranged for a tissue section to be applied to a slide surface. Parts of the tissue section are to be lysed for further analysis, e.g., to extract biological molecules from the tissue, such as DNA material. For example, the tissue may be a biopsy tissue. Slide 120 is shown on top of a slide support 125. For example, slide support 125 may be arranged with a heating element for heating the tissue section on slide 120.

Lysing device 100 comprises a pipetting arm 131 with a pipetting tip 130 at an end of the pipetting arm. The pipetting arm is also referred to as the pipetting channel. The slide surface of slide 120 is facing the pipetting tip 130. Pipetting tip 130 is movable and can be configured for pipetting tip 130 to move to a particular defined location on the tissue section. Typically, pipetting arm 131 is motorized and arranged to be controlled by a program. The program may instruct the pipetting arm 131 and tip 130 for lysing at one or more locations on the tissue section. For example, pipetting arm 131 may be part of a robotic arm arranged to move tip 130 to a desired location on the tissue section.

The pipetting tip 130 is configured to enable the controlled exposure of chemicals to the tissue at the defined location. The tip may also allow dynamic fluid forces at the location to further promote lysing of the tissue section at the location. For example, shear forces may be applied to the tissue through the fluid.

The location on the tissue section, e.g., a part or area or region of the tissue section, comprises the material that is to be detached, e.g., to be lysed. The location is also referred to as the area of interest (AoI). The size of the location is determined by the size of the pipetting tip 130. Often a circular shape is taken for the pipetting tip 130, and for the location, but this is not necessary. For example, the location may comprise a circular area defined by the corresponding inner diameter of a lysis chamber (discussed below). Other shapes, say triangular, or the like is possible, and may even be advantageous if, say multiple locations are to be combined to maximize the amount of tissue detached from the tissue section. For example, the location may comprise an area whose shape is defined by the corresponding shape of a lysis chamber.

A lysing unit 140 may be configured to move pipetting tip 130 to the location on the tissue section, supply, and aspirate fluids to and from pipetting tip 130, and the like.

Figure 1B:
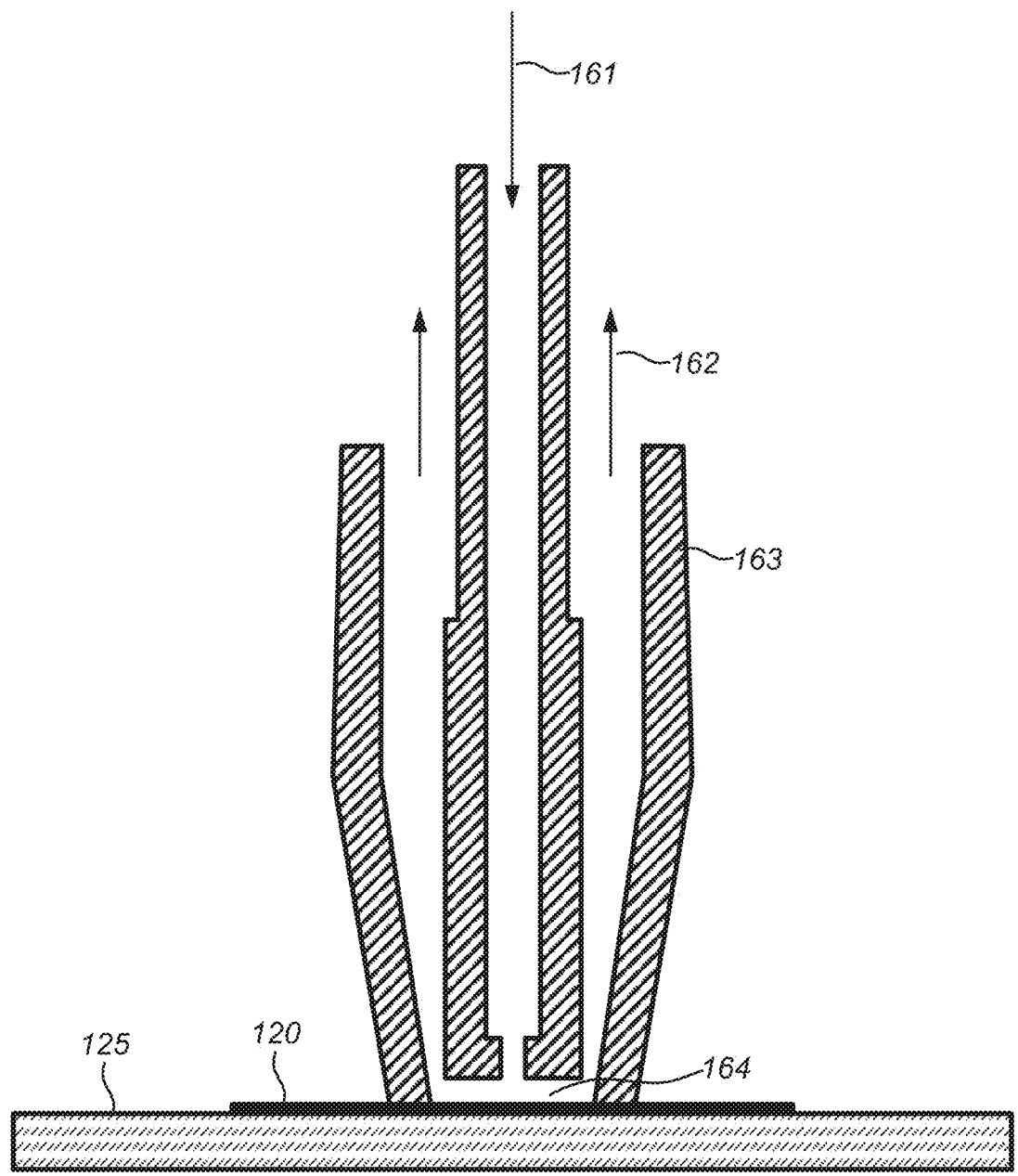

FIG. 1b schematically shows an example of an embodiment of a pipetting tip 163, which may be used for tip 130. The pipetting tip is arranged with a lysis chamber 164, also referred to as the sealing section. In lysis chamber 164, fluid supplied by the pipetting tip can remain in contact with the location of the tissue section for a defined amount of time. Shown in FIG. 1b is inflow of lysing fluid towards the lysis chamber, e.g., supplied by lysing unit 140, and the outflow of lysate back towards the lysing unit 140. The lysed tissue material, also referred to as the lysate, may be transferred to a lysate collection vessel for further processing, e.g., purification, or the like.

For example, lysing may comprise moving the motorized pipetting tip to the location, dispensing a lysis buffer through the pipetting tip into lysis chamber 164 at an end of the pipetting tip at the area of interest, and aspiring lysed material. The lysis buffer in the lysis chamber may be heated to a lysis temperature.

Advantageously, the pipetting tip is provided with a so-called tip extender. This is advantageous since it allows easy replacement of the pipetting tip. For example, the lysis chamber may be formed by the pipette tip extension. The lysis chamber is also referred to as a sealing section. For example, a pipette tip extension may be attachable to a pipette tip. The pipette tip extension may enclose an inner cavity which is delimited by the inner side of an exterior wall. The pipette tip extension may comprise a seal for sealing the pipette tip extension when it is placed with the distal end onto a surface. Although advantageous, a tip extender is not necessary, as its function can be performed by the pipetting tip. Further information and examples of tip extender can be found, e.g., in international patent publications WO2020131072 and WO2020132394, both of which are included herein by reference.

By way of example, a small area of interest may have a surface of about 2 mm$^2$, with a dispense aperture having for example a radius of about 0.79 mm. A small area of interest may for example have a diameter of about 1 mm. A medium sized area of interest may for example have a surface of about 10 mm$^2$, with the dispense aperture of the pipette tip extension having for example a radius of about 1.8 mm. A medium-sized area of interest may for example have a diameter of about 4 mm.

In an exemplary embodiment, the dispense aperture at a distal end of the pipette tip extension may have a circular shape or a circular cross section, respectively, viewed orthogonally to the medial axis of the pipette tip extension. The cross section of the dispense aperture may however depart from a circular shape, for example may be oval, triangular or may have another form, for example a polygonal form. The shape and/or the size of the dispense aperture may for example be adapted to a specific application or use of the pipette tip extension, for example to a specific area of interest of a tissue section which shall be addressed. Exemplarily, a particularly suitable size of a dispense aperture with an essentially circular shape may have a diameter of 1.65 mm. Suitable diameters may be in the range of 0.2 mm to 7 mm, in particular in the range of 1 to 2 mm.

In an exemplary embodiment, the lysing area, e.g., the area of interest, may have a surface area size of 0.01 $mm^2$ or more, preferably, 0.1 $mm^2$ or more, more preferably 1 $mm^2$ or more. For example, the surface area size may be in a range from 0.01 $mm^2$ to 200 $mm^2$, although values above or below this range are possible. For example, the surface area size may be 8.5 $mm^2$, 12.5 $mm^2$, or 75 $mm^2$ or more, or less.

Returning to FIG. 1a, by moving the pipetting tip to a location of interest and lysing the tissue section at that location, some part of the tissue is lysed and obtained in unit 140 where it can be further processed. Lysing of tissue in this manner, especially automated or partially automated, is advantageous, as it is quick and reliable.

For example, in a lysing iteration, lysing fluid may be provided to the lysis chamber, and after some time, aspirated back together with lysed material. The time the lysing fluid is in the chamber, as well as other factors, have an impact on the amount of material that is detached from the tissue slide.

For example, the tissue detachment mechanism may comprise various phases. For example, tissue detachment may comprise one or more soaking phase(s), and/or washings phase(s). Soakings have a slow buffer flow across the sample which allows an effective heat intake from the heat block into the buffer within the lysis chamber. This helps to digest the tissue. During a washing, in contrast, the buffer flows faster across the sample. This creates higher shearing forces and physically removes partially detached tissue pieces from the slide. However, washings decrease the buffers working temperature on the sample and therefore decrease the chemical lysis efficiency. The number of lysing cycles, the duration, and the intensity of a lysing cycles, e.g., the relative amount of washing versus soaking can be represented as lysing parameters. The lysing device can be configured with one or more new lysing parameter, e.g., a number of cycles, a duration, relative amount of washing versus soaking, a washing intensity, duration of an iteration, the amount of shear force applied, the lysing fluid used, and so on. A further parameter includes the temperature during lysing. For example, a heating element, e.g., in a slide support, may be configured to increase or decrease a temperature during the lysing. The amount of tissue detached during a lysing cycle also depend on the tissue type itself.

For example, a schedule may be defined in the lysing device and/or tracking device. Each level of the schedule combines different lysing parameters, the levels of the schedule representing different intensities. Moving from one level in the schedule to a next level is a convenient way to change intensity. For example, the schedule may define an increasing duration together with an increased relative amount of soaking versus washing.

For example, tracking progress can be obtained from lysis progress values that can be determined from images taken after all or part of the lysing cycles. For example, lysing the tissue may comprise multiple lysing cycles at a defined location. A lysing cycle may comprise applying a lysing fluid to the defined location, and later aspirating the lysate. After a lysing cycle, an image can be taken of the tissue section, showing the defined location. A new lysing cycles may use fresh lysing fluid, e.g., fluid arranged for lysing tissue at a location of the tissue section. Lysing fluid may be reused on other detachment positions. In an embodiment, the same lysis buffer is reused at least twice, and at most 6 times on different detachment locations. If a tip extender is used, it too may be reused on multiple detachment locations. On the other hand, it is not needed to reuse the lysis buffer or tip extender either. For example, every detachment location may have its own lysis buffer and tip extender.

Lysis progress values may be used to determine lysing parameters, e.g., the number of cycles to use, amongst others. Lysis progress values may also be used for fault detection in the lysing apparatus, e.g., for debugging. This may be automated as well. For example, if lysis progress values show less lysis progress than expected this may be due to a fault, e.g., insufficient, or incorrect lysing fluid, incorrect seal, and so on, especially, if the lysis progress is much lower than expected. For example, a lower than expected lysis progress, e.g., lower than a threshold, may be signaled, e.g., a warning may be sent to an operator of the device.

A camera 150 may be included in lysing device 100 to take images of the tissue section in succeeding stages of tissue detachment, e.g., of lysing. For example, an embodiment may comprise a sequence of taking a first image, moving the pipetting tip into position to lyse at the defined location, executing a first lysing cycle, which may include applying and subsequent aspiration of lysing fluid, moving the pipetting tip away from the defined location, taking a second image, moving the pipetting tip into position to lyse at the defined location, executing a second lysing cycle, moving the pipetting tip away from the defined location, and so on.

In an embodiment, lysing cycles are alternated with imaging. For example, imaging the defined location on the tissue section using a camera after each iteration until lysing at the location is finished. In this manner, one obtains multiple images of the defined location. The images show the progress of the lysing in the lysing cycles. The images show the defined location and the lysis area associated with it. Typically, an image is taken after each lysing iteration, e.g., lysing and imaging alternate. In that case there are as many images as lysing cycles. An image may also be taken before the first lysing. This initial image is convenient, e.g., for a user to define a location, e.g., to select from the image. The initial image may give a further data point to gauge lysis progress. However, some care is needed as for some tissue types, lysis progress shows differently between the first two images than between later images. One way to account for this is to discard the first number of images that have a different color progression; typically only the first image. Another approach is to compute lysis progress values differently for such images.

Optionally, the lysing fluid that is applied to the defined location in a lysing iteration comprises a dye. The dye may be premixed with the lysing fluid, but the lysing apparatus, e.g. the lysing unit may be arranged with a dye contained comprising dye and configured to selectively add the dye to the lysing fluid. For example, the dye may color the cell, e.g., to better track the lysing progress. For example, Aniline blue may be used as a colorant.

It is not strictly necessary to image as often as there are lysing cycles. For example, in an embodiment, the frequency of imaging could be lower than 1, say, a frequency of % wherein an image is taken after each other cycle. In an embodiment, an imaging schedule is used. For example, according to a schedule, images are taken after cycles $b_1$, $b_2$, .... For example, one may have $b_i=i$ or $b_i=i-1$. For example, $b_1$ may be 0, $b_2$ may be 4, and $b_i=2i$.

In an embodiment, imaging start after a predetermined minimal number of cycles which are anyway needed. For example, $b_1$ may be 5, and $b_i$ may be i+4.

The lysing schedule may continue until lysis progress becomes too small, and/or until some preset maximum has been reached, or the like.

Moving the pipetting tip to and from the defined location may be done with a movable, e.g., motorized arm. For example, a robotic arm may be used. In an embodiment camera 150 may be used to guide arm towards the defined location, although this is not necessary. Slide 120 may comprise one or more fiducials to aid in locating the defined location in the camera image. Camera 150 and/or said fiducials may be used by guiding software configured to guide pipetting arm 131 to the defined location.

In an embodiment, the pipetting tip is moved parallel to tissue slide 120; creating an optical path from camera 150 to the defined location. In FIG. 1*a*, the camera is shown above the tissue section, but this is not necessary. For example, the optical path may comprise angels, e.g., by including one or more mirrors in the optical path. This allows the camera to be located at a different position, away from the lysing unit.

In an embodiment, the pipetting tip is moved orthogonal to tissue slide 120; creating an optical path from camera 150 to the defined location. For example, camera 150 may be attached to pipetting tip 130 or arm 131. By moving orthogonally away from tissue slide 120, an optical path is created for camera 150 to take an image of the defined location.

Combinations of parallel and/or orthogonal movement are possible, with or without using optical elements such as mirrors, optical fibers, and the like. The camera may be a conventional camera or a fiber optic camera.

Camera 150 may be connected to a tracking system to compute lysis progress values that are associated with an estimated amount of detached material. The tracking system may be a stand-alone system, e.g., external to lysing device 100, but may also be integrated with lysing device 100. For example, the tracking system may comprise a computer configured with an algorithm to compute lysis progress values from the images. Lysis progress values may be computed in a unit such as grams or mol, to indicate the weight of detached tissue or the number of bio-molecules detached from the tissue. Having such a unit is not necessary though, for example, the lysis progress value may be proportional, or even approximately proportional, to grams or mols. It is not necessary for the relationship between amount of detached material and the lysis progress value to be highly accurate to be useful.

The lysis progress values may be used to compute or adapt lysing parameters, e.g., the number of cycles and the like. The lysing parameters may be used on a next detachment, e.g., on a next defined location and/or on a next tissue section. For example, in an embodiment, after computing lysing parameters, multiple iterations of lysing at a new defined location or tissue section may be performed using the new lysing parameters. Interestingly, in the new batch of lysing cycles it is not needed to take images; it is also not needed to move the pipetting tip away and to the defined location to take the image. Since the lysing parameters were improved using images the second batch of lysing cycles is more efficient, Moreover, not taking images or fewer in the second batch of lysing cycles will also reduce lysis time.

For example, to determine the lysing parameter of number of cycles, a tracking system may compare the lysis progress values that are determined from the series of images, and compare them to a lysis target value. The lysis target value may have been determined beforehand. Once the lysis target value has been reached, little additional value is gained from repeated lysing cycles at the defined location. It is hard to predict beforehand how many cycles will be needed, since the number of cycles depends on the tissue and on the other lysing parameters, by determining the number of cycles from the images a better estimate is obtained. This both improves speed, by avoiding lysing cycles that are unlikely to gain much additional tissue material, and increases yield, e.g., the amount of detached tissue material, by avoiding moving on to a new defined location too quickly. Yield is important for a number of applications. For example, an incipient tumor on a tissue section may not have much tissue available so that getting more material from the amount that is there is important. In an application, the tradeoff between speed and yield may be configurable by a user. The tradeoff point can be set based on the images, e.g., by selecting a different lysis progress target.

Figure 2A:
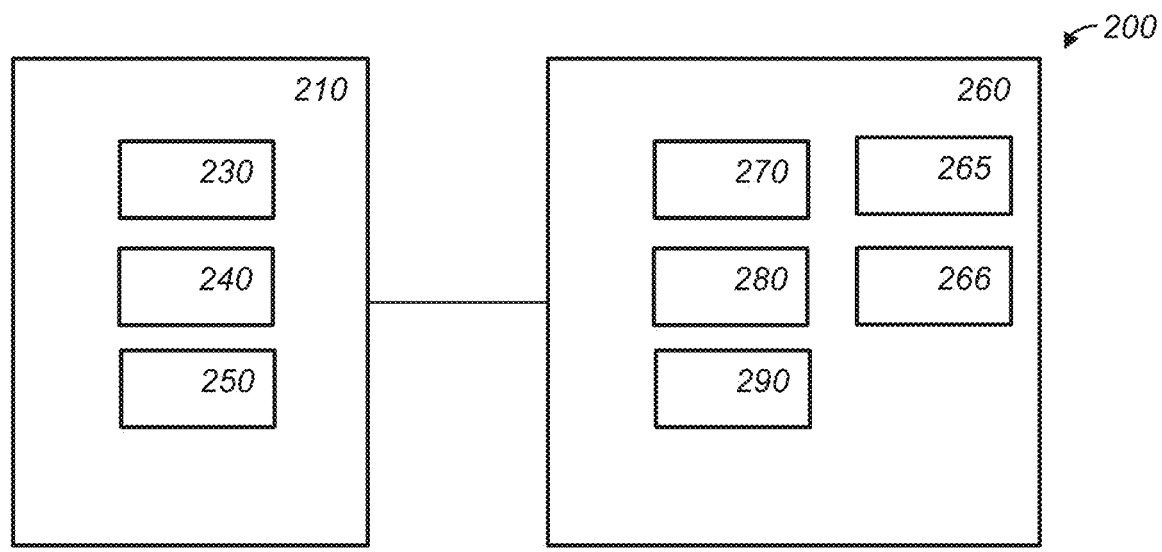

FIG. 2*a* schematically shows an example of an embodiment of a lysing system 200. Lysing system 200 comprises a tracking device 210 and a lysing device 260. Lysing device 260 is configured for executing repeated lysing cycles at a defined location. For example, a lysing cycle may comprise applying a lysing fluid, allow soaking and/or washing, and aspirating the lysate. Tracking device 210 is configured for tracking lysis progress in lysing device 260. Tracking device 210 may be implemented as a tracking system, e.g., distributed over multiple locations, e.g., in a distributed cloud implementation.

Tracking device 210 may comprise a processor system 230, a storage 240, and a communication interface 250. Lysing device 260 may comprise a processor system 270, a storage 280, and a communication interface 290. Lysing device 260 may further comprise lysing apparatus 265 and a camera 266. For example, the lysing apparatus 265 may comprise a mechanism to perform repeated lysing cycles at a defined location. For example, camera 266 may be configured to repeatedly image the defined location in successive stages of lysing cycles. The lysing apparatus 265 may be configured to perform the lysing operations, e.g., moving the pipetting arm, lysing at a location of the tissue section, and aspirating and/or collecting the lysate.

Storage 240 and/or 280 may comprise local storage, e.g., a local hard drive or electronic memory. Storage 240 and/or 280 may comprise non-local storage, e.g., cloud storage. In the latter case, storage 240 and/or 280 may comprise a storage interface to the non-local storage.

Tracking device 210 and/or lysing device 260 may communicate internally, with each other, with other systems, external storage, input devices, output devices, and/or one or more sensors over a computer network. The computer network may be an internet, an intranet, a LAN, a WLAN, etc. The computer network may be the Internet. The system comprises a connection interface which is arranged to communicate within the system or outside the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

For example, in an embodiment, lysing device 260 performs multiple lysing cycles at a location of a tissue section, taking multiple images of the location showing lysis progress. An operator of lysing device 260 may connect a tracking device to lysing device 260, so that the lysing device 260 sends and the tracking device receives the multiple images. The tracking device can in turn send lysing parameters back to the lysing device. Connecting may be wired or wireless, etc. The tracking device may instead be included in the lysing device.

In system 200, the communication interfaces 250 and 290 may be used to send or receive digital data. For example, lysing device 260 may send digital images representing lysing stages to tracking device 210. For example, tracking device 210 may send digital lysing parameters to lysing device 260.

The execution of system 200, tracking device 210 and/or lysing device 260 may be implemented in a processor system, e.g., one or more processor circuits, e.g., microprocessors, examples of which are shown herein. The processor system may comprise one or more GPUs and/or CPUs. System 200 may comprise multiple processors, which may be distributed over different locations. For example, system 200 may use cloud computing.

System 200, tracking device 210 and/or lysing device 260 may comprise functional units that may be functional units of the processor system. For example, these may be used as a blueprint of a possible functional organization of the processor system. The processor circuit(s) are not shown separate from the units in some of the figures. For example, the functional units shown in FIG. 2c may be wholly or partially implemented in computer instructions that are stored at system 200, tracking device 210 and/or lysing device 260, e.g., in an electronic memory thereof, and are executable by a microprocessor thereof. In hybrid embodiments, functional units are implemented partially in hardware, e.g., as coprocessors, e.g., image processor for analyzing digital images including a defined location, and partially in software stored and executed on system 200.

Figure 2B:
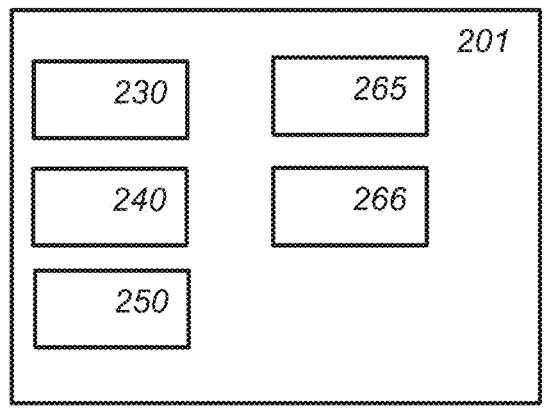

FIG. 2b schematically shows an example of an embodiment of a lysing system 201 in which tracking device and lysing device are integrated. For example, a processor system 230, a storage 240, and a communication interface 250 may be configured to perform the tasks needed for the lysing part of system 201 in addition to the tracking tasks.

Figure 2C:
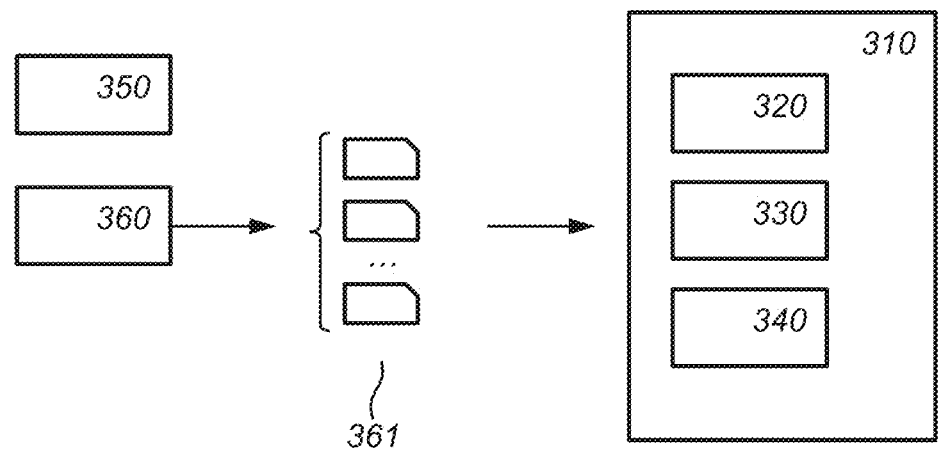

FIG. 2c schematically shows an example of an embodiment of a lysing system 300. Lysing system 300 comprises a lysing apparatus 350 configured for performing lysing cycles at a defined location, and a camera 360 for imaging the defined location. These may be in the same device or system, or not. Camera 360 is configured to generate multiple images 361, which are sent to an image processing part 310. Image processing part 310 comprises an image analyzing unit 320, a lysis progress unit 330, and a lysing management unit 340. For example, image analyzing unit 320 may be configured to identify the defined location in the image, and to derive from an image the lysis progress value. Lysis progress unit 330 may be configured to determine lysing parameters from the lysis progress values. Lysing management unit 340 may be used to manage sending the lysing parameters to the lysing apparatus. Lysing management unit 340 may also be configured to keep track of multiple defined locations, possibly at multiple tissue slides. The organization of unit 310 may be used to organize a software package to perform tracking tasks and/or other lysing operations, but other organizations are possible.

In an embodiment, a lysing device, e.g., lysing device 260, combined device 201, lysing device 350, etc., is configured to receive a slide having a tissue section applied on the slide surface. For example, the slide may be a glass slide, or some other appropriate material. The lysing device is further configured to execute multiple iterations of lysing at a defined location on the tissue section using a motorized pipetting tip and imaging the defined location on the tissue section using a camera, thus obtaining multiple images. The pipetting tip may control exposure of the tissue to chemicals, but may also be configured to allow fluid forces, e.g., shear forces at the pipetting tip, e.g., in a lysis chamber. The images show the defined location, and typically also some of the surrounding tissue. The images may have a fixed perspective, e.g., obtained from a camera at a fixed location.

In an embodiment, the tissue section is paraffined and/or formalin fixed. These are an important application since formalin fixes the tissue, e.g., the proteins. Paraffined and/or formalin fixed tissue is also known as FFPE tissue. These are an important application of embodiments. It is not necessary though to restrict to FFPE tissue. In an embodiment, the tissue section is fresh frozen tissue.

The lysing device may be configured, for example, to extract biomolecules from the lysed tissue material, e.g., one or more of nucleic acids, proteins, lipids, and hormones. For example, the lysing device may be configured to aspirate lysed tissue material, e.g., the lysate, and to depose it in a lysate collection vessel. For example, the vessel may be a well, a tube, in particular, an Eppendorf Tube, a microplate, and so on. The lysing device may comprise the vessel, e.g., inside lysing unit 140 or the like. A lysing device may be configured for further processing of the lysate, e.g., purifying, obtaining particular biomolecules, etc. The lysing device may also be arranged for the lysate to be collected and processed by a different machine.

For example, in an embodiment, lysing at a defined location on the tissue section comprises
 moving the motorized pipetting tip to the location, dispensing a lysis buffer through the pipetting tip into a lysis chamber at an end of the pipetting tip at the defined location, e.g., at the area of interest, and aspiring lysed material. The lysing may take place in a lysis chamber which may be established by the slide and/or tissue section on the one hand and the pipetting tip on the other. If extensions are used, the lysis chamber may be defined by the pipetting tip extension mounted on the pipetting tip and the tissue section/slide. Lysing at a defined location on the tissue section may optionally comprise heating the lysis buffer in the lysis chamber to a lysis temperature. For example, the heating may be done by a heating element at the opposite side of the tissue section as the pipetting tip. Heating has several advantages; it may speed up the lysing and may melt the paraffin (if used).

The defined location may be defined by a user. For example, the user may define the defined location by defining coordinates that indicate the defined location. For example, the lysing device may be configured to image the slide before lysing, displaying said image in a user interface configured to enable the user to define the location. For example, the user may indicate in a user interface the coordinates or the position in the image, etc. The defined location may be defined by an algorithm. For example, an algorithm may define a location where lysing is to take place. For example, an algorithm may define one or more locations of interest, where the tissue appearance diverges from regular tissue. For example, a neural network may identify locations where tissue is suspect, e.g., diverges from a norm.

In an embodiment, the defined location is defined by a user, e.g., through a user interface. For example, the lysing device may be configured to image the tissue section before lysing, displaying said image in a user interface configured to enable the user to define the location. One or more locations may be defined by an algorithm, e.g., running in the tracking or lysing apparatus.

Imaging at the defined location on the tissue section using a camera may comprise moving the motorized pipetting tip away from the location, and triggering the camera to take the image. Note that the lysate will be aspirated back into the pipetting tip before moving it from the slide. In an embodiment, the camera may be moved to the location, but instead a fixed camera may also be used.

Figure 2D:
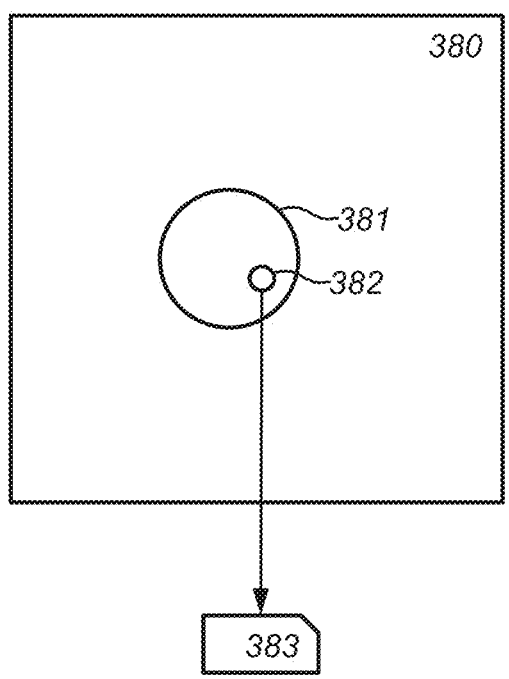

FIG. 2d schematically shows an example of an embodiment of an image 380. Image 380 may be obtained by a camera, such as camera 150, 266, and/or 360. Image 380 shows the defined location 381, including an area where lysing took place.

The location 381 may be found on image 380 in various ways, for example, the location may be known from the defined location. For example, the defined location in the tissue section may correspond to known coordinates in image 380. For example, a translation function may be applied to the location in the tissue section, e.g., for use by the pipetting unit, to obtain the location in the image, or vice versa. For example, the translation function may be obtained by calibrating the camera to the tissue slide. For example, a tissue slide may include fiducials at known locations to calibrate the translation function.

The location 381 may be found by correlating image 380 with a known shape of the area included around the location. For example, for circular lysis chambers, the location will be visible as a disc with a different color. By correlating a disc at various location of the image 380, the location 381 can be found at peak correlation. Instead of a correlation function other image recognition functions may be used. For example, a neural network may be trained to find location 381 in an image.

Translation function and image recognition may be combined. For example, the approximate location may be found using a translation function, which may then be fine-tuned using image recognition, e.g., by finding the location near the approximate location.

Inside the location, the image comprises pixels. For example, image 380 shows pixel 382. The pixels have a pixel value. For example, pixel 382 has pixel value 383. In an embodiment, only one value per pixel is used. For example, the pixel value may be a brightness value. For example, image 380 may be a gray-scale image, or may be converted to a gray scale value, in which case the pixel value can be the value of the pixel. In an embodiment, the pixels are normalized. For example, the value in the image may be normalized to have average value 0, and standard distribution 1. The normalized values may be used as the pixel value. A pixel value may directly be used as lysis progress values, although various improvements are possible which are discussed herein.

For example, pixel values may be byte sized, word sized, or the like. For example, a pixel value may be a floating point number, e.g., centered around zero. Pixel values, possibly processed by averaging or the like, may be used as lysis progress values.

FIGS. 2e.1 and 2e.7 schematically shows an example of an embodiment of a location together with its associated area. In FIG. 2e.1, the area at the location is a disc. In FIG. 2e.7 the area is a triangle. Various other shapes are possible. For example, the area associated with the location may be defined by a point in the shape, e.g., a center point, midpoint, vertex, or the like. The lysis progress value may be determined from one or more pixel values obtained from the location. Various examples thereof are given.

For example, pixel values may be determined from the location, e.g., from the area shown in FIG. 2e.1 or 2e.7 or 381, etc., and the lysis progress value may be determined from the one or more pixel values. For example, a lysis value function may be defined and applied to one or more determined pixel values that may be determined from the area at the location. Lysis progress values may be determined in the same or a similar manner across the multiple images to determining multiple lysis progress values. From the sequence of lysis progress values, one or more lysing parameters may be determined. For example, a lysis value function may take multiple pixel values as input, e.g., single dimensional numbers, e.g., in case of gray values or converted gray values, or multi-dimensional numbers, e.g., in case of color values.

In FIGS. 2e.2-2e.6, 2e.8 and 2e.9 the lysis progress value is determined from multiple pixel values that correspond to pixels in the shaded area.

FIG. 2e.2, schematically illustrate an example of determining a lysis progress value, wherein the pixel values in the area at the location are averaged. For example, this may be an average gray value or an average color value. For example, if color images are used, a pixel may have multiple color values. The average may be weighted average of the color values, e.g., in which different colors have different weights.

FIG. 2e.3, schematically illustrate an example of determining a lysis progress value. A potential problem that can occur with some lysing parameters is that bubbles are formed at the tissue section. The pixel values corresponding to the part of the image representing the bubble are less representative for lysis progress. The inventors found that bubbles are typically formed near the center of the area at the location. Accordingly, by computing a lysis progress value from the values at the edge of the location, e.g., a strip at the edge, a more accurate value is obtained. For example, once the location is found in the image, an edge of the area may be identified, the pixel values of which may be used to compute the progress value. Instead of an edge, a strip at the edge may be used. For example, they may be averaged or the like. In an embodiment, the lysis progress value for an image is determined from an edge of the location in the image.

For example, the width of the strip may have a predetermined thickness at the edge of the lysing area; for example, a ring at the outer edge of a radius of a circular lysis area. For example, the area of the strip may be between 0.5 and 1.5 mm. The area with low bubble density depends, e.g., on the surface tension of the used lysing fluid and tissue.

Although bubbles are most often found at the edge of the detachment location, this is not always the case, and bubbles can occur elsewhere too. This can be resolved by computing a mask to filter out the bubbles.

FIG. 2e.4, schematically illustrate an example of determining a lysis progress value. Another way to compute the progress value is to select a location in the area and to compute the lysis progress value from there. For example, a part may be found that is free from bubbles. For example, an image recognition algorithm configured for identifying bubbles may find that the shaded area in FIG. 2e.4 is free from bubbles. The pixel values in the shaded area may be averaged.

FIG. 2e.5, schematically illustrate an example of determining a lysis progress value. In an embodiment, bubbles are recognized, e.g., using an image recognition algorithm.

The progress value may be computed from the whole area at the location but with the part where a bubble is found excluded.

FIG. 2e.6, schematically illustrate an example of determining a lysis progress value. In an embodiment, an area without bubbles is recognized, e.g., using an image recognition algorithm. The progress value may be computed from the whole area at the location where no bubble was found. In an embodiment, pixel values are weighted with a confidence value that indicates the likelihood that a bubble is absent.

The various ways to compute lysis progress values may be adapted to different shapes of the location. As an example, FIG. 2e.7 shows a triangular area, pixel values of which may be used to compute lysis progress. FIG. 2e.8 shows a corresponding embodiment in which the whole area is averaged. FIG. 2e.9 shows a corresponding embodiment in which a lysis progress value is computed from a strip at the edge of the location.

The computation of the lysis progress value may be expressed as a mask. For example, the mask may express which pixel value to include in the average, and which values to exclude. For example, the mask may be a binary mask. The binary mask indicating which values to include and which to exclude. For example, the mask may be a gray scale mask. The gray scale mask indicating how to weigh values at the location. A high weight indicating a high likelihood that the pixel gives a good indicating of lysis progress (e.g., no bubbles) while a low value indicating a low likelihood that the pixel gives a good indicating of lysis progress (e.g., bubbles).

For example, in an embodiment bubbles are identified by thresholding. For example, a bubble pixel may be defined by a gray value within the disk shape that is much higher than the gray value of the same pixel on the first captured image before first lysis.

In an embodiment, the lysis progress values are computed in an identical manner for all images. For example, the same mask is used for all images. For example, any part at the location, e.g., in the area of interest at the location, that had a bubble in any image may be excluded from consideration for all images. For example, once image 1 to n are available a mask may be computed that is applicable for all images 1 to n. Using the mask a lysis progress value may be computed in an identical manner for images 1 to n. In some embodiment, additional images may be acquired if the lysis progress values suggests that more lysing is possible. In that case, an image n+1 may be obtained. In that case, a new mask may be computed over images 1 to n+1. Using the same mask for all images improves consistency across the images.

Computing lysis progress values from a tissue section is applicable to various types of tissue conservation. In particular, it was found that lysis progress values can be computed especially well from paraffined and/or formalin fixed tissue, e.g., FFPE tissue, as the paraffin removal causes a marked change of brightness in the tissue.

For example, in an embodiment, determining a lysis progress value for an image comprises detecting a non-bubble part at the location in the image where bubbles are absent, and determining the lysis progress value from pixel values at the non-bubble part in the image. In an embodiment, a non-bubble part at the location in the image is determined where bubbles are absent. The lysis progress value may be determined from pixel values at the non-bubble part in the image. For example, determining a lysis progress value may comprise determining a mask indicating bubbles in the image, applying the mask to the image, and determining the lysis progress value from pixel values at a non-masked part of the image. Other types of impairments are the reflections formed in the image. In an embodiment, a non-impaired part at the location in the image, e.g., without reflections and/or bubbles, is determined where the impairment(s) are absent. The lysis progress value may be determined from pixel values at the non-bubble part in the image. The type of detected and avoided impairments may be predetermined. A mask may be used to avoid bubbles, but also other types of impairment(s).

Although averaging pixel values works well in practice, other lysis value functions may be used. For example, in early iterations pixel values in the lysis areas can be uneven, as in some part lysis proceed quicker than in other parts. Accordingly, standard deviation of pixel values is higher when lysis is in its early stages, and decreases with lysing cycles. Accordingly, standard deviation may be used as a lysis progress value instead, or as well.

There are various ways to compute a lysing parameter from the lysis progress values that are computed from the series of images taken from the defined location. In an embodiment, the lysing parameter is determined from the lysis progress values, e.g., by applying a determination function to the series. For example, consider the series of lysis progress values to be $a_1, a_2, \ldots$.

A parameter that may be determined is the number of lysing cycles that are to be applied to a defined location. For example, in an embodiment, the number of iterations that are needed to reach a target value for the lysis progress values may be taken as the number of iterations. For example, the smallest i for which $a_i > v$, where v is the target value. The number i found in this manner may be taken as the lysis parameter, 'number of cycles'. In general, for inequalities like this, one may take larger or equal as well; in this case, an embodiment may use the smallest i for which $a_i \geq v$.

Another way to determine the number of cycles is wait for the lysis progress values to stabilize, and/or when the increase in progress is smaller than a threshold. For example, one may take the smallest i such that $a_{i+1} - a_i < v$, or $a_{i+1} - a_i \leq v$ for a target value v. For example, one may take the smallest i such that $a_{i+1}/a_i < v$, or $a_{i+1}/a_i \leq v$ for a target value v.

Typically, lysis progress values start to stabilize before the additional yield from a new lysis cycle becomes zero. After lysis progress values have stabilized, they give little additional information. In practice, this is not a problem though as moving to a new location at this point is generally advisable. Even if higher yields are needed, the lysis progress values leading up to the stabilization may be used to guide the lysing parameters. For example, one might take the number of cycles to reach lysis progress value stabilization times a multiplies, say times 1.2, say an increase of 20%. In this manner, lysis progress values that indicate fast progression will still lead to a lower number of total lysing cycles.

It may happen that the initial determined progress values are not useful, as the color of the tissue is not sufficiently related to the color of the tissue after partial lysing. In that case, one may discard the first value, say $a_1$, or first few values, say $a_1, a_2$.

Another lysing parameter that may be determined is lysing intensity. For example, if after a predetermined number of iterations, say 5 iterations, or the like, the lysis progress is still below a target, say $a_5 < v$, then lysing intensity may be increased. Another way to gauge lysing intensity, is to verify that lysis progress increase is below a target, say, $a_6 - a_5 < v$ for some target v. For example, in an embodiment, increments between lysis progress values may be compared with a lysis increment target to determine the lysing intensity. The value 5 in this case is an example, it may be 4 or 6, or even larger. For example, the predetermined value may be selected such that for the chosen lysing technology, a significant amount of lysis is expected but also significantly less than full lysis.

For example, intensity may be increased by increasing the duration of a cycle. By increasing the duration of a cycle, lysing intensity increases. On the other hand, the time needed for a cycle also increases. On the other hand, if lysing proceeds quickly enough, lysing intensity may be decreased. In an embodiment, the lysing parameter comprises the duration of a lysing application, said duration is increased if increase of the lysing progress values is below a threshold. Another way to increase lysing intensity is to increase the relative amount of soaking compared to washing in the cycle For example, in an embodiment, an intensity schedule may be defined with multiple levels of intensity, e.g., wherein the length of a cycles increases, say from 15 to 60 seconds, and wherein the relative duration of soaking in a cycles increases, say from 50% to 97%. These ranges are exemplifying and may depend on the tissue, the lysing fluid, the temperature, etc. If lysing does not progress quickly enough, lysing intensity may be increased. On the other hand, if lysing does progress quickly enough, lysing intensity may be decreased. Yet another way to change lysing intensity is to change the lysing fluid, and/or the amount of the active enzyme therein, e.g., proteinase K, also referred to as PK. Lysing fluid is also referred to as lysing buffer.

Once a lysing parameter has been determined, e.g., number of cycles, duration of a cycle, amount of soaking, lysing fluid, etc., the lysing parameter may be applied to a next batch of lysing cycles without taking images. The lysing parameter may be applied to a next batch of lysing cycles while taking images to verify that the new lysing parameter (s) are adequate. The next batch may result in a further modification of the lysing parameter.

The number of cycling iterations used during the imaging may be constant, e.g., an upper bound on the number of cycles. This simplifies the algorithms, as a constant number of data values are obtained. On the other hand, the lysing cycles may be terminated once the lysing parameter has been determined.

Figure 3A:
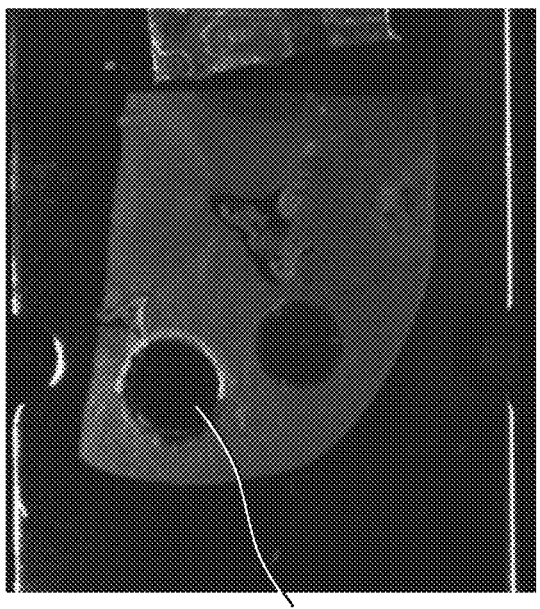
FIGS. 3a-3d show an example of an embodiment of lysing detachments with paraffin.
Figure 3B:
Figure 3C:
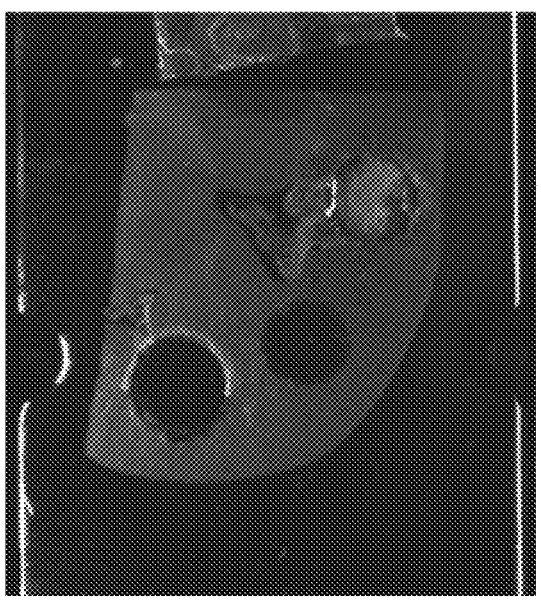
Figure 3D:

FIGS. 3a-3d show an example of an embodiment of lysing detachments with paraffin. The figure shows a tissue section in which two defined locations have already been lysed. One of the previously lysed locations is location 371. At the top right, lysing is done at a new defined location, indicated in FIG. 3d with a circle 372 around the defined location. In FIG. 3a, no lysing has been done, while FIGS. 3b-3d show the tissue section after various lysing cycles. Graphs 4a-4c correspond to the lysing shown in FIGS. 3a-3d.

Figure 4A:
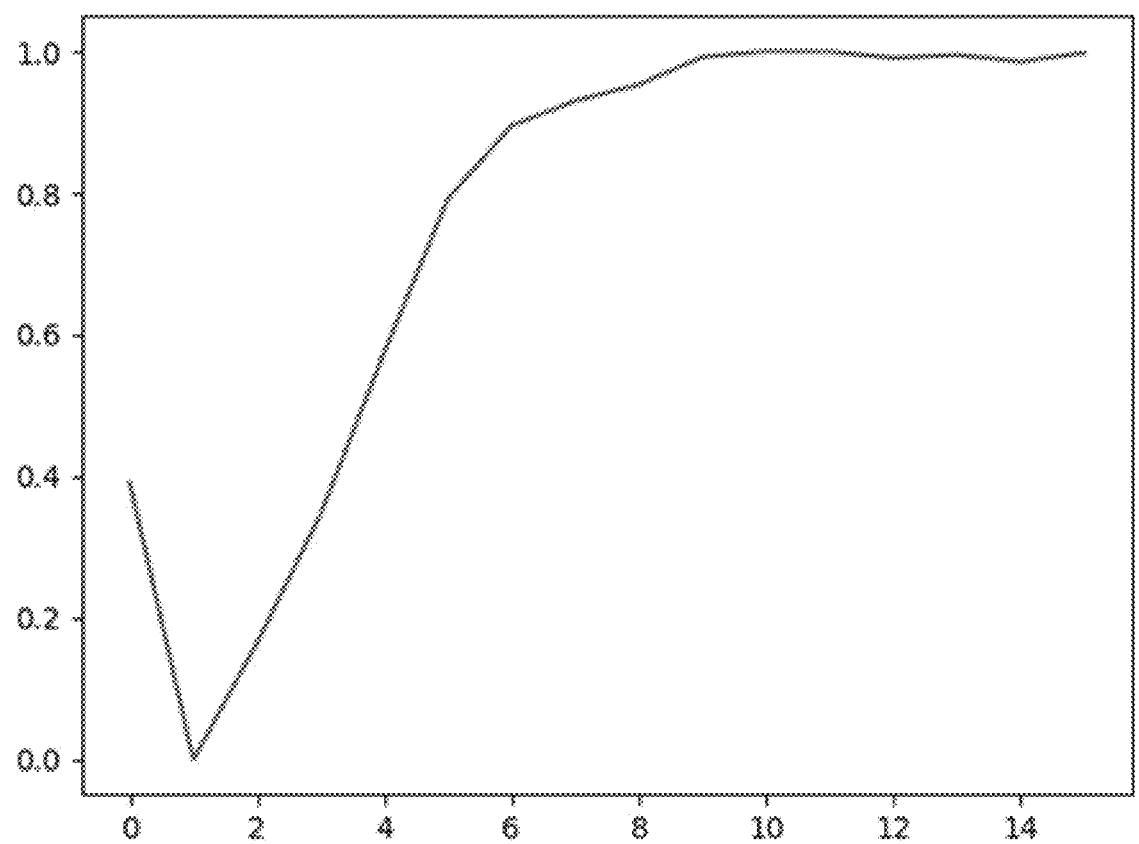
FIG. 4a shows an example of an embodiment of picture brightness versus lysing cycle.

FIG. 4a shows an example of an embodiment of picture brightness versus lysing cycle for the lysing shown in FIGS. 3a-3d note that higher values correspond to a lower brightness. Lysing cycles is at the horizontal axis. Note that the brightness between the first two iterations increases rather than decreases. One may deal with this anomaly by discarding the initial value. One may also adapt to this phenomenon by using a different mapping function from pixel values to lysis progress that depends on the lysing cycle. FIG. 4a shows that after the initial lysing cycles that brightness of the defined location becomes increasingly darker.

Figure 4B:
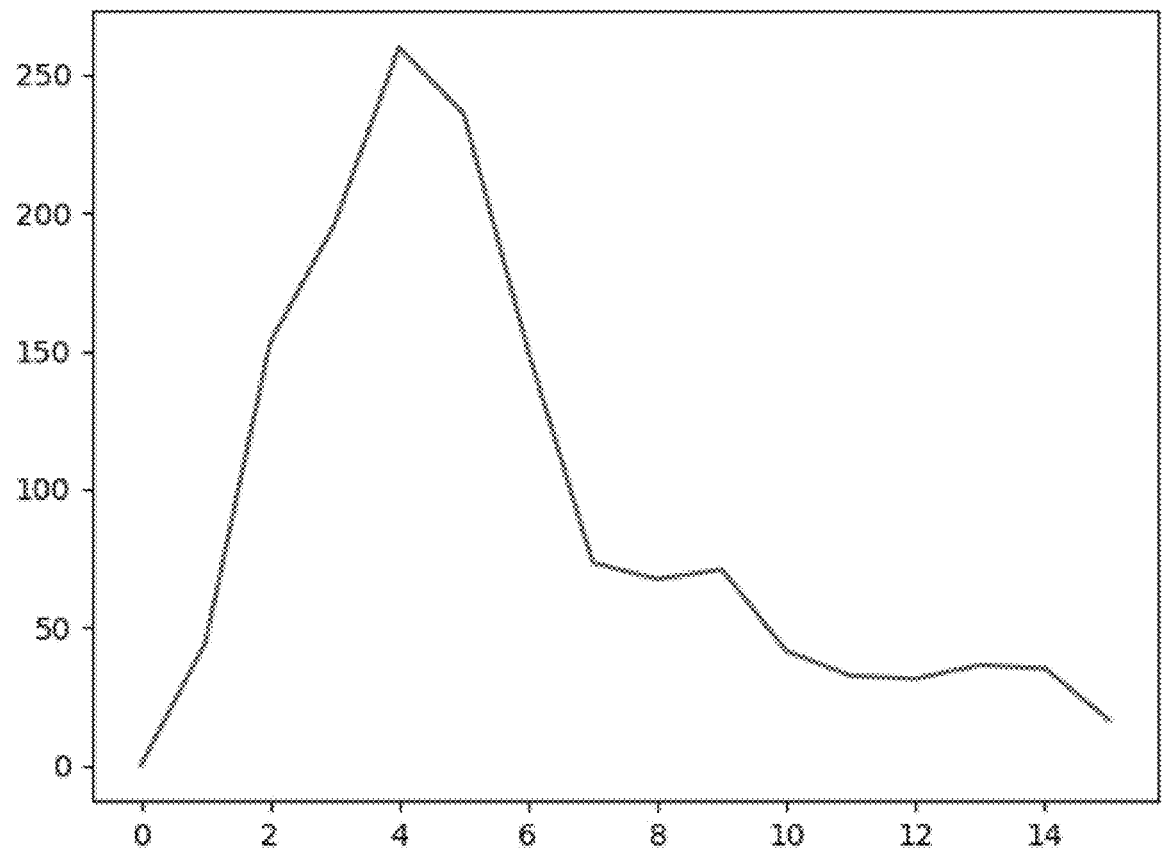
FIG. 4b shows an example of an embodiment of dsDNA versus lysing cycle.
Figure 4C:
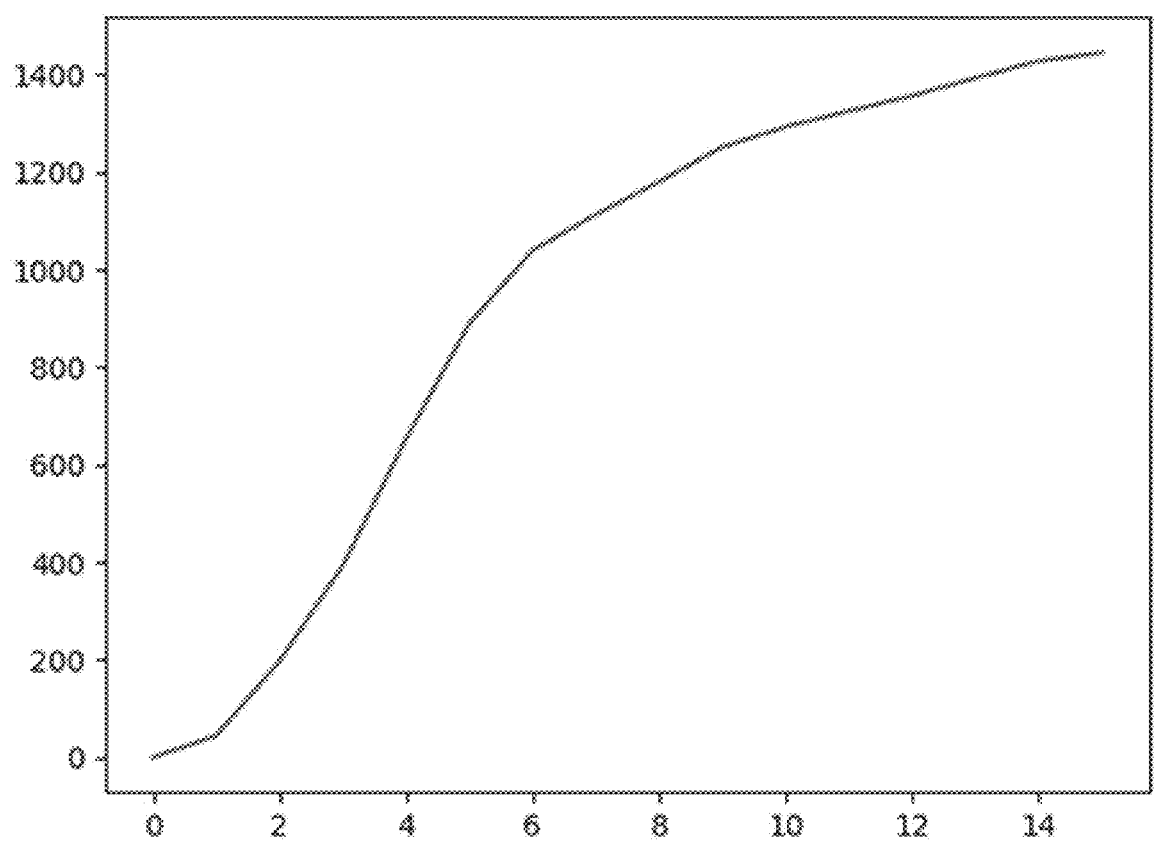
FIG. 4c shows an example of an embodiment of cumulative dsDNA versus lysing cycle.

FIG. 4b shows an example of an embodiment of dsDNA versus lysing cycle. The amount of double-stranded DNA that was obtained from a cycle is shown at the vertical axis in ng/ml. Note that the amount of DNA obtained peaks at the fourth cycle, and then decreases. FIG. 4c shows an example of an embodiment of cumulative dsDNA in ng versus lysing cycle.

Visible in FIG. 4c is that about 50% of the total amount of lysed material is obtained after 4 cycles, that is after about 30% of the cycles are performed. After 5 cycles, that is 35% of the total number of cycles, about 75% of the total amount of recovered material has been obtained. These marks correspond to a lysis progress value of about 0.6 and 0.8, respectively.

For example, a tracking system may be configured to determine the number of lysing cycles that are needed for the lysis progress values to reach 0.8 or higher. That number of cycles may then be used for a new series of lysings at a new location. In this case, that may be after 7 cycles. The lysings in the first data gathering run may be terminated after reaching that point, or the data gathering run may be run to a maximal number of cycles, in this case 14.

Also visible in FIG. 4a is a stabilization of the lysis progress values, starting at cycle number 9. From FIG. 4c it can be seen, that at that point about 85% of the lysate has been obtained. Stabilization of the lysate progress values may be used to set the number of cycles as well. Indeed, FIG. 4b shows, starting at cycles 10 a reduced yield of cycles 10 and further.

Also visible in FIG. 4c is that at 5 cycles, a lysis progress value of about 0.8 is reached. In this case, corresponding to about 75% of the total amount that was obtained from this location. This can be taken as an indication that lysis intensity is sufficient. If the lysis progress value at this point were much lower, this may be taken as an indication to increase the lysing intensity, e.g., increase duration, move to a new level in a lysing intensity schedule, or the like. Likewise, if the lysis progress values at 5 was much higher, or if values had stabilized. This may be used as indication to reduce intensity, in particular, to reduce duration.

FIGS. 5a-5d show an example of an embodiment of lysing detachments. The images show images at increasing stages of the lysing process. Xylene is typically used to deparaffinize FFPE tissue, and/or, e.g., to apply staining such as H&E stain. Here a xylol bath was used for deparaffinization. Also in these pictures a number of locations have already been lysed. At the bottom of the tissue section, indicated with the circle in FIG. 5d a new location is lysed. Note that this embodiment does not show the aberrant color change at the first cycle. Although not easily visible with the naked eye, some bubble formation is present in FIGS. 5a-5d. To avoid a negative effect of pixel values that are very bright on the accuracy of the progress values that are computed from the pixel values, a mask is computed. For example, a pixel may be too bright due to, e.g., bubbles, liquid, light reflections, and the like. FIG. 5e shows an example of an embodiment of a mask. The mask in this example, is a binary mask. The white pixels correspond to pixel values that are taken into account to compute the lysis progress values; the black values correspond to pixel values that are not taken into account. Undesired effects within the detachment area may be filtered out with the black pixels.

Figure 5A:
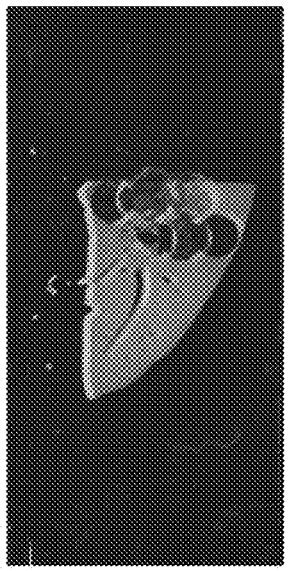
FIGS. 5a-5d show an example of an embodiment of lysing detachments.
Figure 5B:
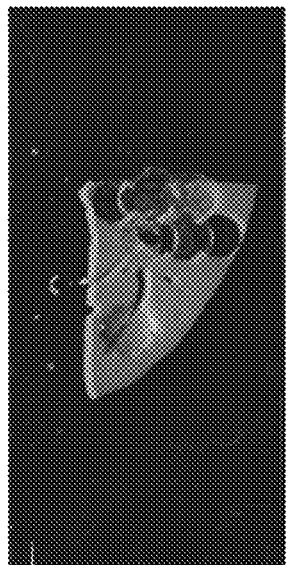
Figure 5C:
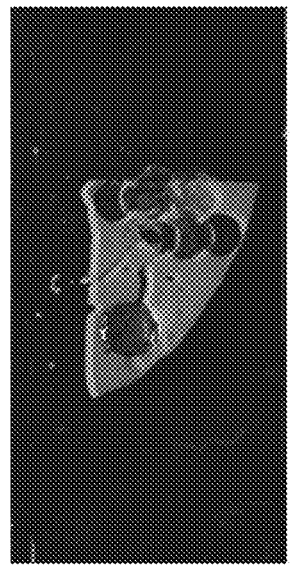
Figure 5D:
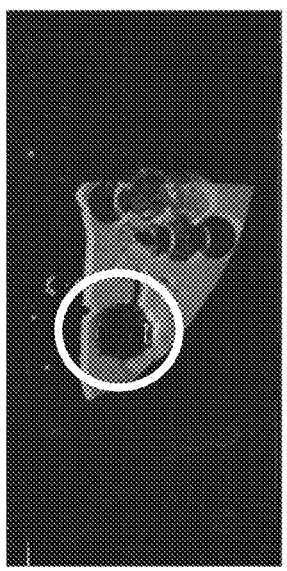
Figure 5E:
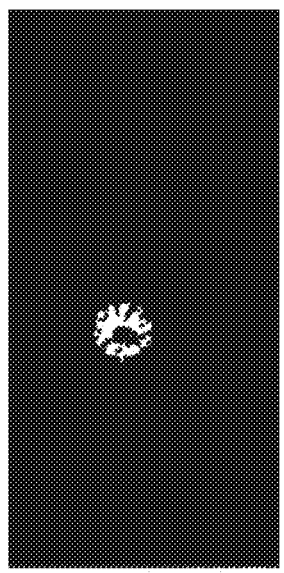
FIG. 5e shows an example of an embodiment of a mask.
Figure 5F:
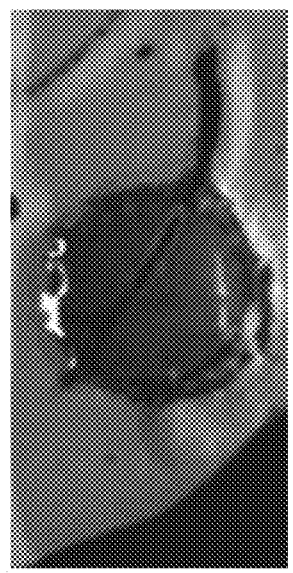
FIG. 5f shows a detail of FIG. 5c.

FIG. 5f shows a detail of FIG. 5c. FIG. 5f shows an enlargement of the lysing location in image 5c. On the left side of the location the reflection of the illumination is visible in the surface tension of the residual liquid. Such effects may also be avoided, e.g., masked. In an embodiment, the illumination is on a fixed side, here the left side. For example, one could restrict computing of the lysing progress values to the right side of the location to avoid illumination reflections. For example, the mask of FIG. 5e may be cropped to remove the left side of the mask.

Figure 6A:
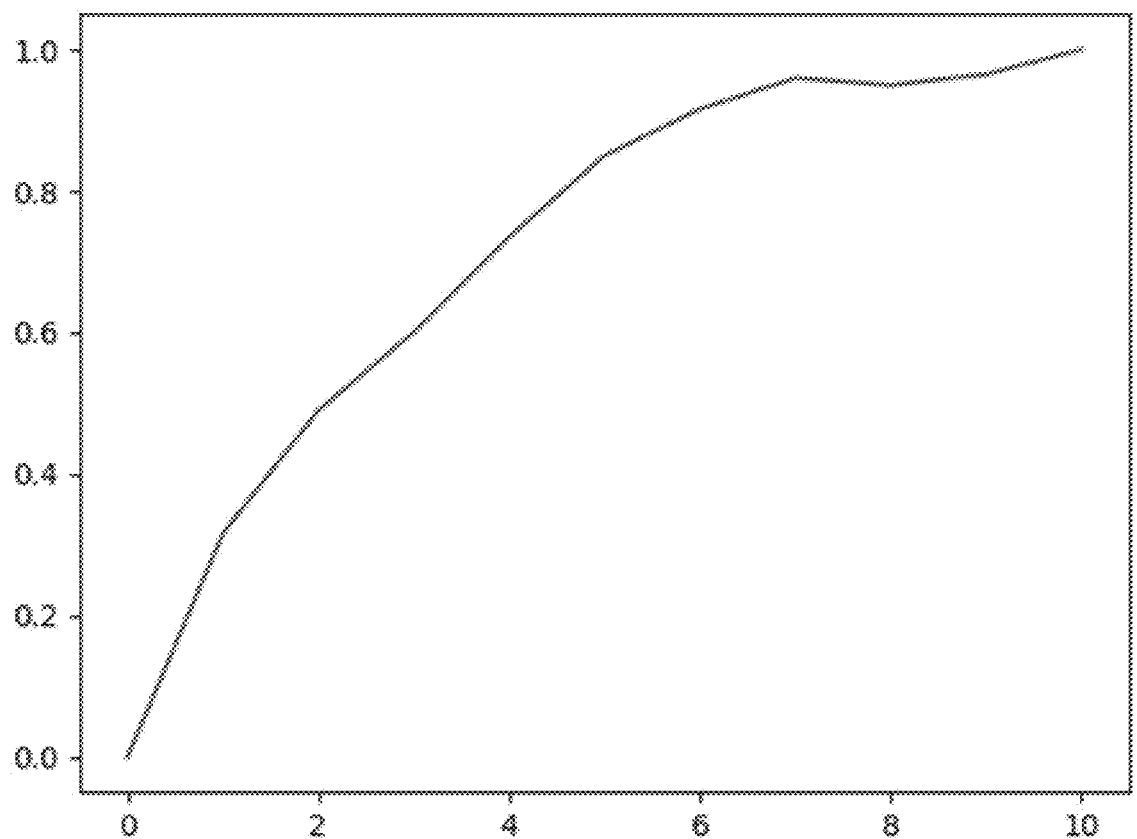
FIG. 6a shows an example of an embodiment of picture brightness versus lysing cycle.
Figure 6B:
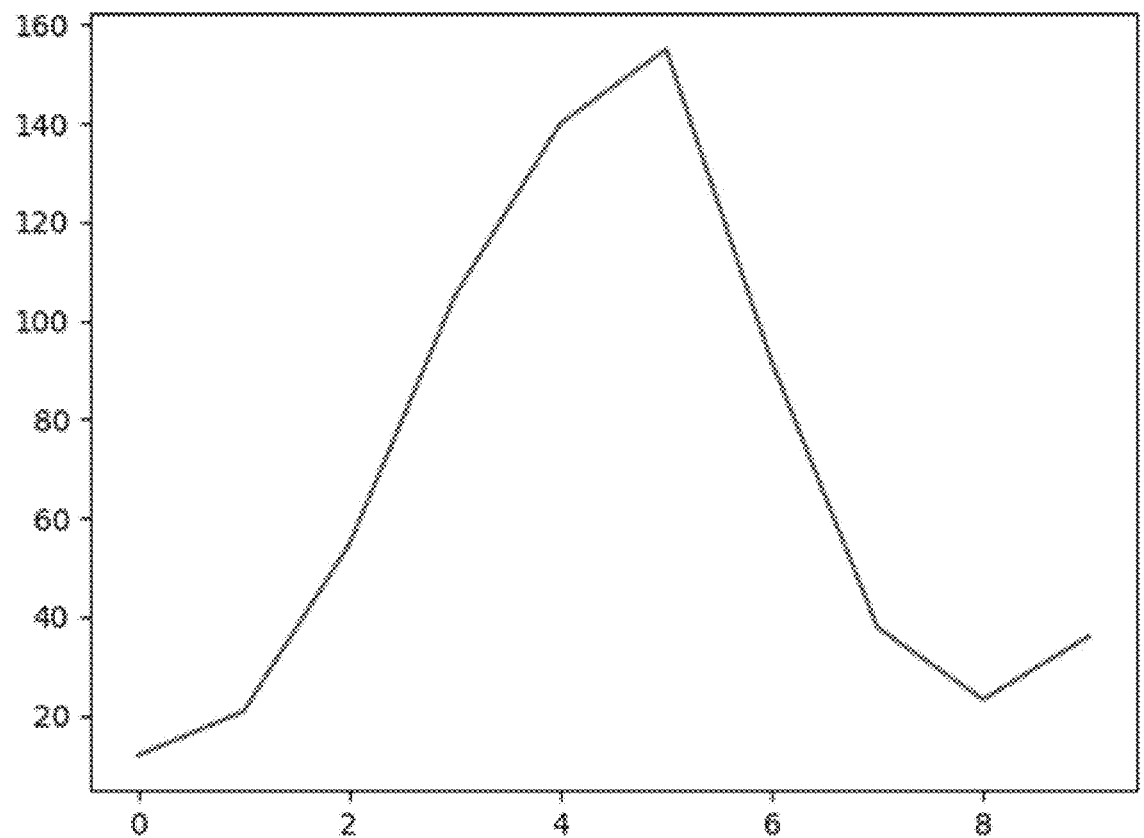
FIG. 6b shows an example of an embodiment of double-stranded DNA versus lysing cycle.
Figure 6C:
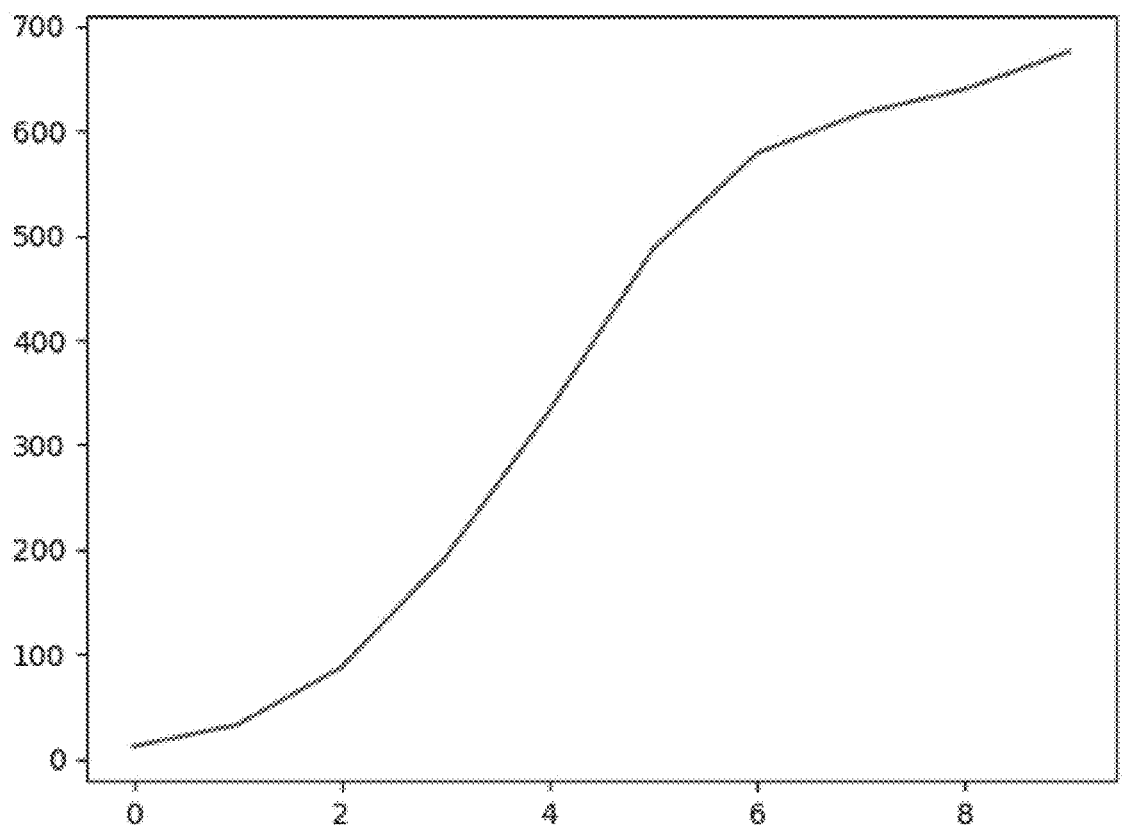
FIG. 6c shows an example of an embodiment of cumulative dsDNA versus lysing cycle.

Similar to FIGS. 4a-4c. FIG. 6a shows an example of an embodiment of picture brightness versus lysing cycle. FIG. 6b shows an example of an embodiment of dsDNA versus lysing cycle. FIG. 6c shows an example of an embodiment of cumulative dsDNA in ng versus lysing cycle.

The lysing experiment show in these figures used fewer cycles (8) than the experiment shown in FIGS. 3a-4c. Visible in FIG. 6c is that about 50% of the total amount of lysed material is obtained after 4 cycles. After 5 cycles, about 75% of the total amount of recovered material has been obtained. These marks correspond to a lysis progress value of about 0.7 and 0.8, respectively.

For example, a tracking system may be configured to determine the number of lysing cycles that are needed for the lysis progress values to reach 0.8 or higher. That number of cycles may then be used for a new series of lysings at a new location. In this case, that may be after 5 cycles.

Also visible in FIG. 6a is a stabilization of the lysis progress values, starting at cycle number 7. From FIG. 6c it can be seen, that at that point about 85% of the lysate has been obtained. FIG. 6b shows, starting at cycle 7 a reduced yield.

Also visible in FIG. 4c is that at 5 cycles, a lysis progress value of just over 0.8 is reached. In this case, corresponding to about 75% of the total amount that was obtained from this location. This can be taken as an indication that lysis intensity is sufficient.

Note that, for the different tissues used for FIGS. 4a-4c and 6a-6c an embodiment may suggest different lysis parameters going forward. For example, for the FIG. 6a-6c situation a smaller number of cycles seems sufficient to reach similar yield, than for the FIG. 4a-4c situation. For example, if lysis progress value stabilization is taken as a criterion, then in the former case 7 cycles may be used, while in the latter case 9 cycles may be used. Using 7 cycles instead of 9 makes the lysing process about 20% more efficient.

The lysis efficiency depends on many parameters, including, e.g., the fixing method, tissue type, section thickness, lysis buffer, lysis temperature, soaking time, washing time, flow speed, number of cycles, chamber geometry, etc. For example, FIGS. 6a-6c and FIGS. 4a-4c show a different lysis efficiency.

Figure 7A:
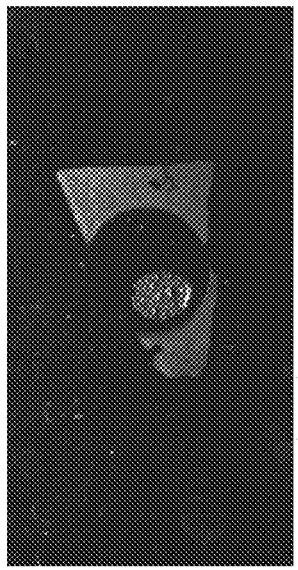
FIG. 7a shows an example of an image with a bubble.
Figure 7B:
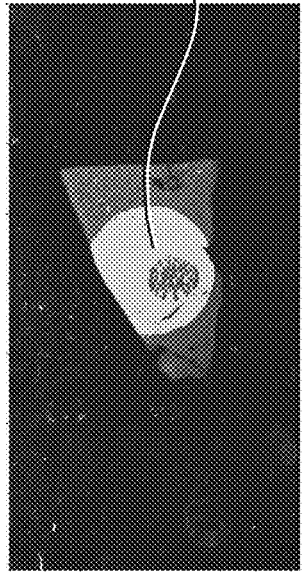
FIG. 7b shows an example of an embodiment of a mask.
Figure 7C:
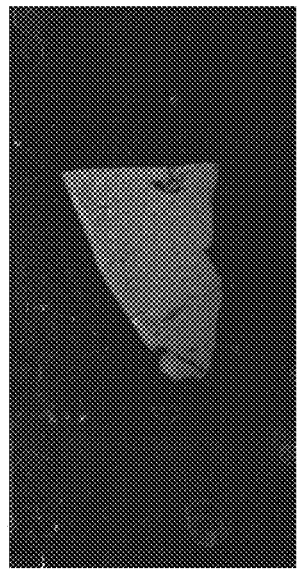
FIG. 7c shows an example of an image before lysing.

FIGS. 7a-7b show yet a further example of an embodiment of lysing detachments. The tissue was deparaffinized with xylene. Interestingly, FIG. 7a shows a clear example of a bubble. FIG. 7b show a mask 401 superimposed over one of the images. FIG. 7c shows the first image, taken before lysing.

One way to compute a mask is to apply an image recognition algorithm to identify pixels that are very bright due to bubbles, liquid, etc. and calculate a mask to exclude the problematic pixel found.

FIG. 7b is FIG. 7a with the mask on top of it. The mask is created by thresholding the difference image from FIGS. 7a and 7c.

Figure 8A:
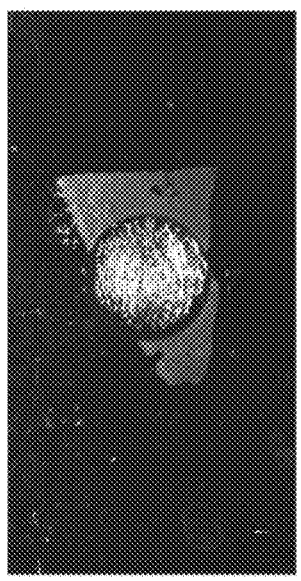
FIG. 8a-8c illustrate an embodiment of computing a mask, FIG. 9 schematically shows an embodiment of a lysing method and an embodiment of a tracking method, FIG. 10a schematically shows a computer readable medium having a writable part comprising a computer program according to an embodiment, FIG. 10b schematically shows a representation of a processor system according to an embodiment.
Figure 8B:
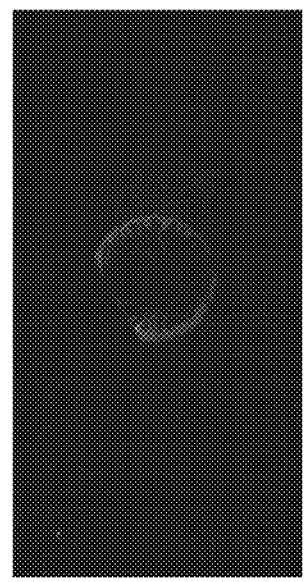
Figure 8C:
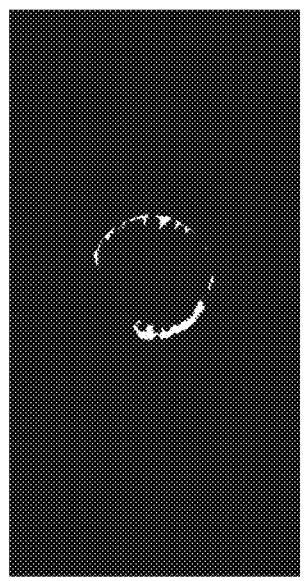

FIG. 8a-8c illustrate a different way to compute a mask. In FIG. 8a, the images are superimposed over each other, with the possible exclusion of the first or first few images. The resulting white mass in the center of the location are caused by bubbles at some stage of the lysing. In FIG. 8b, the white center and the tissue is removed leaving only part of the area where no bubbles where visible in any image. In FIG. 8c the image is converted to a binary image, thus obtaining a mask.

FIG. 8b is a difference image between the image in FIG. 8a and the first captured imaged before lysis shown in FIG. 7c. Note, that the first captured image is not shown. For example, the image of FIG. 8a may be obtained as: FIG. 7c-FIG. 8a. FIG. 8c is a threshold image of 8b. The threshold method can be an Otsu threshold. The threshold image 8c is a binary mask where the white pixels contain the disk shape without the bubbles.

In the various embodiments of systems 100, 200, 201, and 300, and the devices therein, the communication interfaces may be selected from various alternatives. For example, the interface may be a network interface to a local or wide area network, e.g., the Internet, a storage interface to an internal or external data storage, an application interface (API), etc.

The systems 100, 200, 201, and 300 may have a user interface, which may include well-known elements such as one or more buttons, a keyboard, display, touch screen, etc. The user interface may be arranged for accommodating user interaction for configuring the systems. User interaction may comprise one or more of: define one or more defined locations, confirm suggested defined locations, start lysing, review lysis progress values, confirm new lysis parameters, etc.

Storage may be implemented as an electronic memory, say a flash memory, or magnetic memory, say hard disk or the like. Storage may comprise multiple discrete memories together making up the storage, e.g., storage 240, 280. Storage may comprise a temporary memory, say a RAM. The storage may be cloud storage.

Systems 100, 200, 201 and 300 may be implemented in a single device. System 210, 201 may be implemented in a single device. Typically, the systems 100, 200, 201, 300, 210, 260, 310, and 350 each comprise a microprocessor which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, systems may comprise circuits for the evaluation of neural networks.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 9:
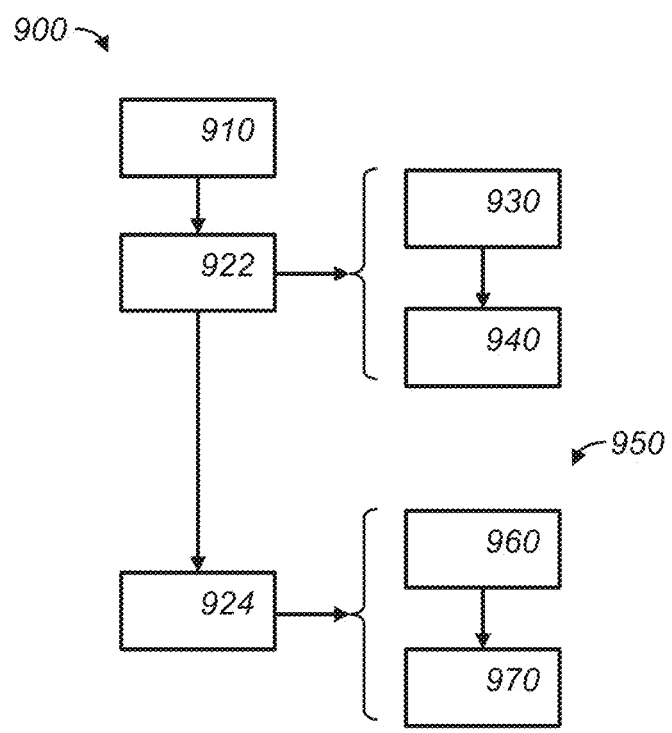

FIG. 9 schematically shows an embodiment of a lysing method 900 and an embodiment of a tracking method 950.

Tissue lysing method 900 comprises
   receiving 910 a slide having a tissue section applied on the slide surface,
   executing 922 multiple iterations of lysing 930 at a defined location on the tissue section using a motorized pipetting tip and imaging 940 the defined location on the tissue section using a camera.

For example, the number of cycles may be predetermined, e.g., ten or fifteen cycles. For example, the predetermined number of cycles may be at least 8, at least 10, etc. This may be regarded as a data gathering phase. The number of cycles may also be dynamically determined based on the data gained from the imaging. For example, once additional cycles do not gain a sufficient amount of additional biomolecules, e.g., DNA as shown by the progress values, executing the cycles may be terminated. After this a further series of lysing cycles may be executed on a new defined location, possibly on a new tissue section. The new series may or may not be data gathering, e.g., may or may not alternate imaging with the cycles. A second series may also image but at a lesser frequency. For example, in the initial data gathering run, an image may be taken after each cycle, whereas in a further run, an image may be taken after every fourth image, or at the end of the cycles, or at the half-way point, or at a fixed point, say the fifth cycle, and so. The information gained from the second series of images may be used to confirm the lysing parameters determined from the initial data gathering run.

Executing the cycles creates multiple images. Method 900 further comprises a tracking part 924. Tracking part 924 may be an embodiment of a tracking method.

Shown in FIG. 9 is tracking method 950. Tracking method 950 comprises determining 960 multiple lysis progress values from the multiple images, the lysis progress values indicating an amount of tissue material lysed from the tissue section at the location, and determining 970 a lysing parameter from the lysis progress values.

Determining 960 multiple lysis progress values may be done as part of the cycle executed by part 922. For example, after each new image is obtained, a new lysis progress value may be obtained. Determining multiple lysis progress values may comprise computing a mask to exclude part of the image that show an impairment from the computation of the lysis progress value, e.g., one or more bubbles or a reflection. Computing a mask is not necessary. For example, if there is little bubble formation, e.g., for some tissue type or detachment type, excluding bubbles from lysis progress value determination may be omitted.

A mask may be computed for each image separately. A mask may also be computed for a batch of images, e.g., for all images up to now, or all images excluding the first one or first few. For example, after a new image is received a new mask may be computed which is applicable for multiple images. The mask may exclude all parts of the area at the defined location that show a bubble in any image. The advantage of using such a mask is that more consistent progress values are obtained.

Instead of computing a mask, one may instead opt to use a part of the area at the defined location that is known to have few bubbles, e.g., a strip at the edge of the area.

The driving of a lysing device, e.g., steering the pipetting arm, applying, and aspirating fluid and so on, may be computer implemented. Tracking lysis progress may be computer implemented.

The tracking method may comprise image recognition algorithms; For example, to recognize the defined location, at the start of after one or more cycles of lysing; For example, to recognize bubble formation. Image recognition may use, e.g., a neural network trained to recognize these features. Image recognition may also use other algorithms. For example, finding the defined location may use correlation between the image and the known shape of the pipetting tip. A location in the image where correlation is maximal corresponds to the defined location. This may be combined with approximate knowledge of the defined location. Bubbles may be found likewise.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 900 and/or 950. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 10A:
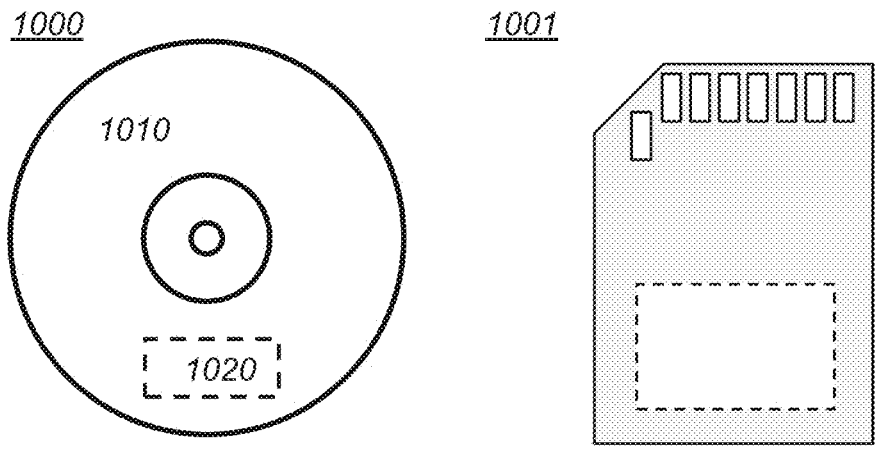

FIG. 10*a* shows a computer readable medium 1000 having a writable part 1010, and a computer readable medium 1001 also having a writable part. Computer readable medium 1000 is shown in the form of an optically readable medium. Computer readable medium 1001 is shown in the form of an electronic memory, in this case a memory card. Computer readable medium 1000 and 1001 may store data 1020 wherein the data may indicate instructions, which when executed by a processor system, cause a processor system to perform an embodiment of a lysing method and/or tracking method, according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said lysing method and/or tracking method.

Figure 10B:
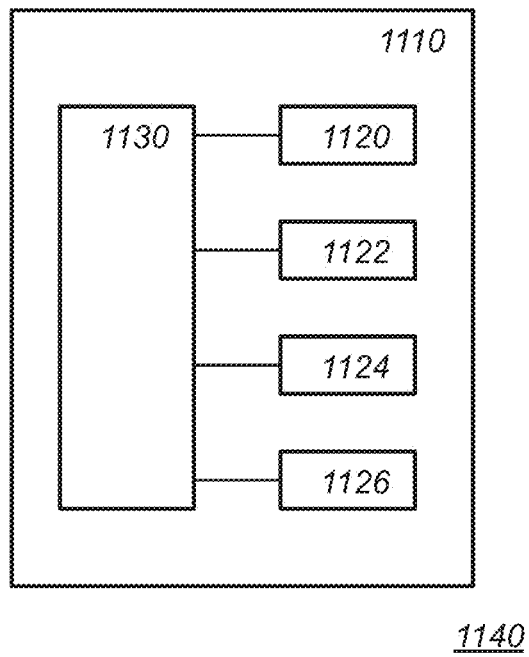

FIG. 10b shows in a schematic representation of a processor system 1140 according to an embodiment of a lysing device and/or an embodiment of a tracking device. The processor system comprises one or more integrated circuits 1110. The architecture of the one or more integrated circuits 1110 is schematically shown in FIG. 10b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., a tracking device or lysing device may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

While device 1140 is shown as including one of each described component, the various components may be duplicated in various embodiments. For example, the processor may include multiple microprocessors that are configured to independently execute the methods described herein or are configured to perform steps or subroutines of the methods described herein such that the multiple processors cooperate to achieve the functionality described herein. Further, where the device 1140 is implemented in a cloud computing system, the various hardware components may belong to separate physical systems. For example, the processor may include a first processor in a first server and a second processor in a second server.

For example, in an example of a distributed embodiment, lysing of a tissue section, and imaging of the tissue section in various stages of lysing takes place at a first location. The images may be digitally transferred to a second location, where a tracking method analyzes them. A resulting lysing parameter can then be transferred back to the lysing device at the first location, where the lysing parameter can be used in a next lysing run.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A computer-implemented method for tracking lysis progress in an automated lysing device, the lysing device being configured to
   receive a slide having a tissue section applied on the slide surface, and
   execute multiple iterations of lysing at a defined location on the tissue section using a motorized pipetting tip and imaging the defined location on the tissue section using a camera, thus obtaining multiple images, the tracking method comprising
   determining multiple lysis progress values from the multiple images, the lysis progress values indicating an amount of tissue material lysed from the tissue section at the location, and
   determining a lysing parameter from the lysis progress values.

2. A tracking method as in claim 1, comprising
   configuring the lysing device to apply the lysing parameter to further iterations of lysing on a further defined location and/or tissue section.

3. A tracking method as in claim 1, wherein the lysing parameter comprises a number of further iterations of lysing to be applied, and the method comprises comparing the lysis progress values with a lysis target to determine the number of further iterations.

4. A tracking method as in claim 1, wherein the lysing parameter comprises a lysing intensity to be applied at the pipetting tip, and the method comprises comparing increments between lysis progress values with a lysis increment target to determine the lysing intensity.

5. A tracking method as in claim 1, wherein the method comprises terminating the iterations when the lysis progress values reach a lysis target.

6. A tracking method as in claim 1, wherein determining a lysis progress value for an image comprises determining pixel values at the location in the image and applying a lysis value function to the determined pixel values.

7. A tracking method as in claim 1, wherein determining a lysis progress value for an image comprises determining an average gray value or average color value from the location in the image, and associating the average value with lysis progress.

8. A tracking method as in claim 1, wherein the lysis progress value for an image is determined from an edge of the location in the image.

9. A tracking method as in claim 1, wherein determining a lysis progress value for an image comprises detecting a non-impaired part at the location in the image where an image impairment is absent, and determining the lysis progress value from pixel values at the non-impaired part in the image.

10. A tracking method as in claim 1, wherein the tissue section is paraffined and/or formalin fixed.

11. A tracking method as in claim 1, wherein lysing at the defined location comprises applying and aspirating a lysing fluid to the defined location.

12. A tracking method as in claim 1, wherein the images show multiple iterations of lysing at the defined location on the tissue section.

13. A method for tissue lysing, the method comprising
receiving a slide having a tissue section applied on the slide surface,
executing multiple iterations of lysing at a defined location on the tissue section using a motorized pipetting tip and imaging the defined location on the tissue section using a camera, thus obtaining multiple images, and a method according to claim 1.

14. A tissue lysing method as in claim 13, comprising extracting of biomolecules from the lysed tissue material, such as one or more of nucleic acids, proteins, lipids, and hormones.

15. A lysing method as in any one of claim 13, wherein imaging the defined location on the tissue section using a camera comprises
moving the motorized pipetting tip from the location, and triggering the camera to take the image.

16. A lysing method as in claim 13, wherein lysing at the defined location comprises applying and aspirating a lysing fluid to the defined location.

17. A lysing tracking system, the system comprising
a communication interface configured to obtain multiple images of a defined location at a tissue section, the images showing multiple iterations of lysing at the defined location on the tissue section using a motorized pipetting tip, and
a processor system configured for
determining multiple lysis progress values from the multiple images, the lysis progress values indicating an amount of tissue material lysed from the tissue section at the location, and
determining a lysing parameter from the lysis progress values.

18. A lysing system, the system comprising
a slide interface arranged to receive a slide having a tissue section applied on the slide surface,
a motorized pipetting tip arranged for lysing at a defined location on the tissue section,
a camera configured for imaging the defined location on the tissue section, and,
a processor system configured for
determining multiple lysis progress values from the multiple images, the lysis progress values indicating an amount of tissue material lysed from the tissue section at the location, and
determining a lysing parameter from the lysis progress values.

19. A transitory or non-transitory computer readable medium comprising data representing instructions, which when executed by a processor system, cause the processor system to track lysis progress in an automated lysing device, comprising
obtain multiple images of a defined location on a tissue section, wherein multiple iterations of lysing were executed at the defined location using a pipetting tip,
determining multiple lysis progress values from the multiple images, the lysis progress values indicating an amount of tissue material lysed from the tissue section at the location, and
determining a lysing parameter from the lysis progress values.

* * * * *